(12) United States Patent
Isoda et al.

(10) Patent No.: US 9,256,261 B2
(45) Date of Patent: Feb. 9, 2016

(54) SEMICONDUCTOR DEVICE HAVING IDENTIFICATION INFORMATION GENERATING FUNCTION AND IDENTIFICATION INFORMATION GENERATION METHOD FOR SEMICONDUCTOR DEVICE

(71) Applicant: Renesas Electronics Corporation, Kawasaki-shi, Kanagawa (JP)

(72) Inventors: Masanori Isoda, Kawasaki (JP); Hidehiro Fujiwara, Kawasaki (JP); Koji Nii, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 352 days.

(21) Appl. No.: 13/903,535

(22) Filed: May 28, 2013

(65) Prior Publication Data
US 2013/0326243 A1 Dec. 5, 2013

(30) Foreign Application Priority Data
May 29, 2012 (JP) ................ 2012-122080

(51) Int. Cl.
*G06F 1/26* (2006.01)
*G06F 3/00* (2006.01)
(Continued)

(52) U.S. Cl.
CPC *G06F 1/26* (2013.01); *G06F 21/44* (2013.01); *G11C 5/14* (2013.01); *G11C 8/20* (2013.01); *G11C 11/417* (2013.01); *G06F 11/2247* (2013.01); *G06F 12/14* (2013.01);
(Continued)

(58) Field of Classification Search
CPC ... G06F 1/26; G06F 2212/1052; G06F 12/14; G06F 21/71; G06F 21/78; G06F 11/2247; G06F 21/44

USPC ............... 713/300; 710/16; 711/163; 726/34
See application file for complete search history.

(56) References Cited

U.S. PATENT DOCUMENTS 7,222,040 B1\* 5/2007 Nishino ............... G06F 11/006
702/117
2002/0167849 A1\* 11/2002 Ohbayashi ............ G11C 29/50
365/189.09
(Continued)

FOREIGN PATENT DOCUMENTS

JP 2001-101083 A 4/2001
JP 2002-278934 A 9/2002

OTHER PUBLICATIONS

H. Fujiwara, et al., "A Chip-ID Generating Circuit for Dependable LSI using Random Address Errors on Embedded SRAM and On-Chip Memory BIST", 2011 Symposium on VLSI Circuits Digest of Technical Papers, Jun. 15-17, 2011, pp. 76-77.
(Continued)

*Primary Examiner* — Ji H Bae
(74) *Attorney, Agent, or Firm* — Sughrue Mion, PLLC

(57) ABSTRACT

A semiconductor device includes an identification information generation circuit having a power supply control circuit whose output voltage is controlled by a control signal, and a memory array having a first cell power line and a second cell power line. The power supply control circuit outputs a first supply voltage and a second supply voltage to a first cell power line and a second power line, respectively, when the control signal is in a first state, and outputs an intermediate voltage to the first cell power line and the second cell power line when the control signal is in a second state.

13 Claims, 21 Drawing Sheets

(51) Int. Cl.
*G06F 12/00* (2006.01)
*G06F 11/00* (2006.01)
*G06F 21/44* (2013.01)
*G11C 5/14* (2006.01)
*G11C 8/20* (2006.01)
*G11C 11/417* (2006.01)
*G06F 11/22* (2006.01)
*G06F 21/71* (2013.01)
*G06F 12/14* (2006.01)
*G06F 21/78* (2013.01)

(52) U.S. Cl.
CPC ............... *G06F 21/71* (2013.01); *G06F 21/78* (2013.01); *G06F 2212/1052* (2013.01)

(56) References Cited

U.S. PATENT DOCUMENTS

| | | | | |
|---|---|---|---|---|
| 2007/0214370 A1* | 9/2007 | Sato | ...................... | H04N 7/1675 713/193 |
| 2010/0205460 A1* | 8/2010 | Lin | .......................... | G06F 21/79 713/193 |
| 2013/0133031 A1* | 5/2013 | Fainstein | ................. | G06F 21/44 726/2 |
| 2014/0070212 A1* | 3/2014 | Fujiwara | ............ | G06K 19/0722 257/48 |

OTHER PUBLICATIONS

Y. Su, et al., "A 1.6pJ/bit 96% Stable Chip-ID Generating Circuit using Process Variations", 2007 IEEE International Solid-State Circuits Conference, pp. 406-407 and pp. 611.

* cited by examiner

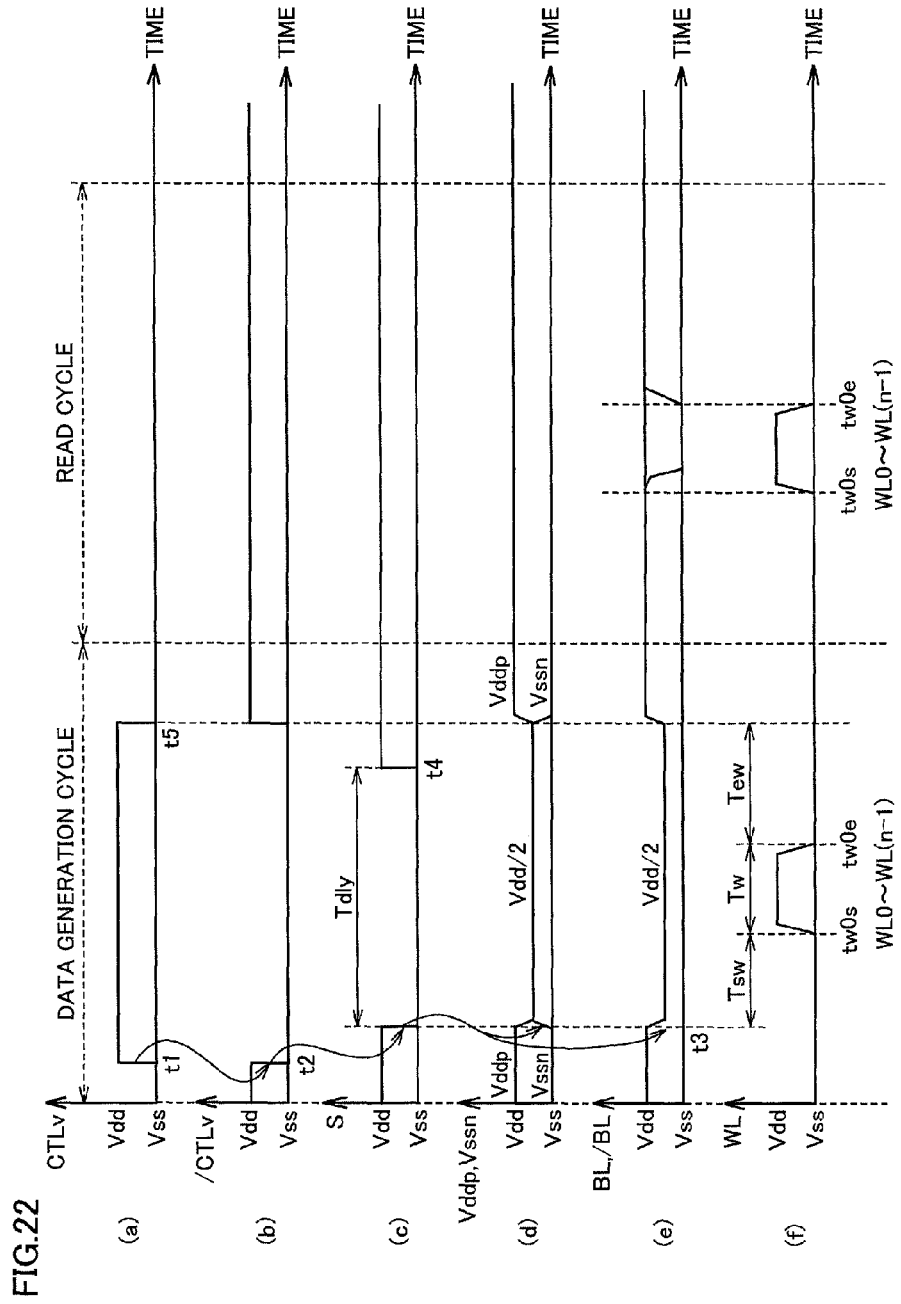

SEMICONDUCTOR DEVICE HAVING IDENTIFICATION INFORMATION GENERATING FUNCTION AND IDENTIFICATION INFORMATION GENERATION METHOD FOR SEMICONDUCTOR DEVICE

CROSS-REFERENCE TO RELATED APPLICATIONS

The disclosure of Japanese Patent Application No. 2012-122080 filed on May 29, 2012 including the specification, drawings and abstract is incorporated herein by reference in its entirety.

BACKGROUND OF THE INVENTION

1. Field of the Invention

The present invention relates to a semiconductor device, and more particularly to a semiconductor device having an identification information generation circuit that generates identification information (ID) specific to a chip and an identification information generation method for a semiconductor device.

2. Description of the Background Art

As a countermeasure against imitation semiconductor devices and frauds in electronic commerce service over the Internet, specific identification information is assigned to each semiconductor chip. For example, a system is known in which, in a manufacturing process of a semiconductor chip, different data per semiconductor chip is written into a fuse or a nonvolatile memory. Another system is known in which random data held by a SRAM cell after power-on is utilized as a "fingerprint" of a semiconductor chip.

Japanese Patent Laying-Open No. 2002-278934 discloses an invention of a security protection system for a handy terminal. The handy terminal generates device identification information based on positional information on a defective block held by a built-in NAND chip.

Japanese Patent Laying-Open No. 2001-101083 discloses an invention in which a defective address of a semiconductor memory is used as a key. A server device holding contents receives a key transmitted from a client device and transmits the contents with the key inserted therein to the client device. H. Fujiwara, M. Yabuuchi, H. Nakano, H. Kawai, K. Nii, and K. Arimoto, "A Chip-ID Generating Circuit for Dependable LSI using Random Address Errors on Embedded SRAM and On-Chip Memory BIST", 2011 Symposium on VLSI Circuits Digest of Technical Papers, Jun. 15-17, 2011, pp. 76-77 (Non-Patent Document 1) discloses a configuration in which chip ID of LSI (semiconductor integrated circuit) is generated based on a defective cell address of an embedded SRAM and an I/O bit position to which the defective cell belongs.

Y. Su, J. Holleman, B. Otis, "A 1.6 pJ/bit 96% Stable Chip-ID Generating Circuit using Process Variations", 2007 IEEE International Solid-State Circuits Conference, pp. 406-407 and p. 611 (Non-Patent Document 2) discloses a configuration in which an original identification number (ID) is generated for each f chip using a latch circuit in which NOR logic gates are cross coupled.

In Non-Patent Document 2, an exclusive latch circuit for generating an original identification number for each chip is provided on a chip. In order to generate an identification number having a sufficient bit length, it is necessary to provide a plurality of latch circuits accordingly, thus resulting in a problem of increased chip area.

SUMMARY OF THE INVENTION

A semiconductor device of an aspect includes an identification information generation circuit including a power supply control circuit having a first input node to which a first control signal is applied, a first power supply voltage output node and a second power supply voltage output node, and a memory array having a bit line pair, a word line, a memory cell connected to the bit line pair and the word line, a first cell power line connected to the memory cell, and a second cell power line connected to the memory cell. The first cell power line and the second cell power line are connected to the first power supply voltage output node and the second power supply voltage output node, respectively. The memory cell has a first conductivity type MOS transistor and a second conductivity type MOS transistor. The power supply control circuit is configured to output a first supply voltage and a second supply voltage to the first power supply voltage output node and the second power supply voltage output node, respectively, when the first control signal is in a first state, and output an intermediate voltage to the first power supply voltage output node and the second power supply voltage output node when the first control signal is in a second state.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 22 is an operation timing chart of a power supply control circuit and the memory array according to the fourth embodiment.

DESCRIPTION OF THE PREFERRED EMBODIMENTS

Figure 1:
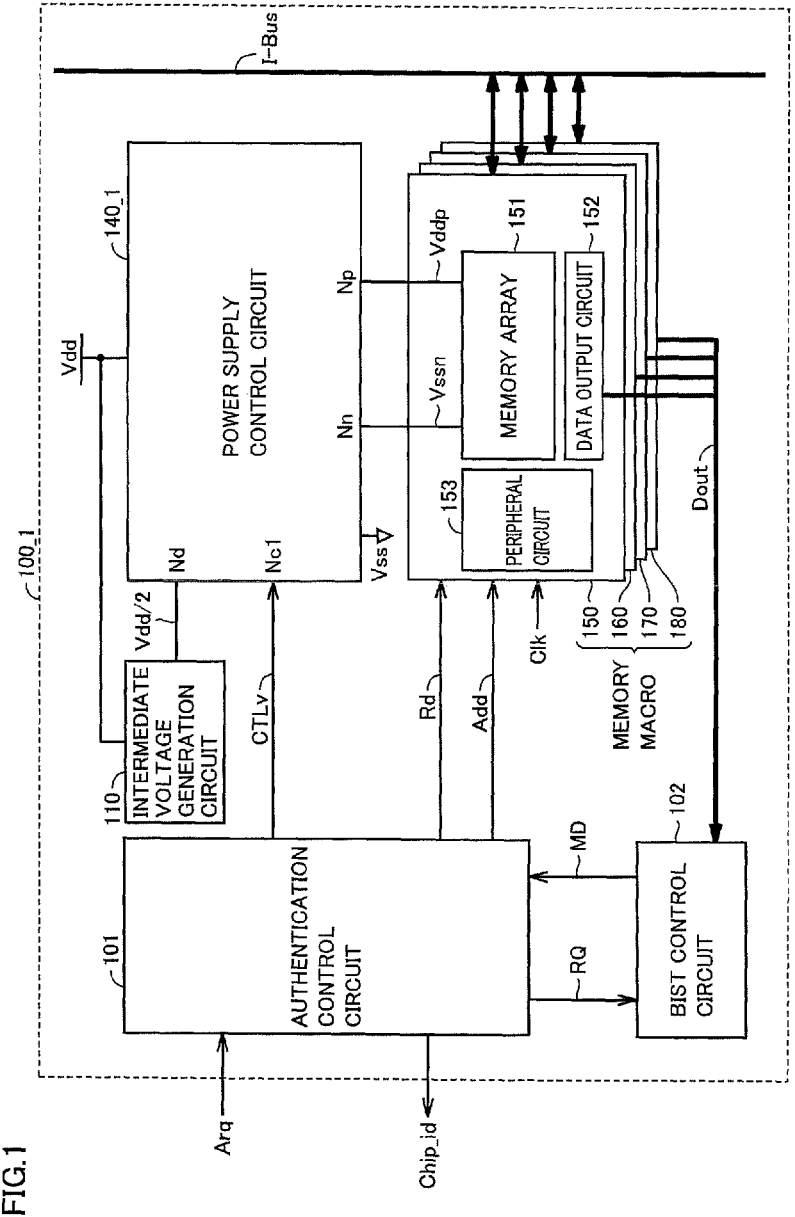
FIG. 1 is a circuit diagram of an identification information generation circuit included in a semiconductor device according to first embodiment.

The embodiments of the present invention will be described below with reference to the drawings. When the number, an amount or the like is mentioned in the embodiments described below, the scope of the present invention is not necessarily limited to that number, that amount or the like, unless otherwise specified. In the drawings, the same or corresponding portions shall have the same reference characters or reference numbers allotted. Moreover, in the description of the embodiments, repeated description of portions allotted the same reference characters and the like may not be given.

[First Embodiment]

Referring to FIG. 1, a configuration of an identification information generation circuit 100_1 included in a semiconductor device according to a first embodiment of the present invention will be described.

The semiconductor device (not shown) includes identification information generation circuit 100_1. The semiconductor device is implemented by a system LSI (Large Scale Integration), such as a microcomputer or SoC (System-on-a-Chip), for example.

Identification information generation circuit 100_1 has an authentication control circuit 101, a BIST (Built-in-Self-Test) control circuit 102, an intermediate voltage generation circuit 110, a power supply control circuit 140_1, memory macros 150 to 180, and an internal bus I-Bus connected to memory macros 150 to 180.

Authentication control circuit 101 generates an authentication control signal CTLv having a binary value in response to an authentication request signal Arq input to the semiconductor device. Intermediate voltage generation circuit 110 generates an intermediate voltage between a supply voltage Vdd applied to power supply control circuit 140_1 and a supply voltage Vss which is lower than Vdd. Supply voltage Vss is a so-called ground voltage, and is usually 0 V. The intermediate voltage refers to a value lower than supply voltage Vdd and higher than supply voltage Vss. As a suitable example, the intermediate voltage in this embodiment is set at a value obtained by dividing the difference between supply voltages Vdd and Vss by 2. Therefore, the intermediate voltage will be denoted by "Vdd/2" for the sake of convenience.

Power supply control circuit 140_1 has an input node Nc1 and an intermediate voltage input node Nd. Authentication control signal CTLv is applied to input node Nc1, and intermediate voltage Vdd/2 is applied to intermediate voltage input node Nd. Power supply control circuit 140_1 further has power supply voltage output nodes Nn and Np.

When authentication control signal CTLv is at the low level, supply voltages Vss and Vdd are output to power supply voltage output nodes Nn and Np, respectively. When authentication control signal CTLv is at the high level, intermediate voltage Vdd/2 is output to both power supply voltage output nodes Nn and Np.

Each of memory macros 150 to 180 has a memory array 151, a data output circuit 152 and a peripheral circuit 153. Cell power lines Vssn and Vddp are connected to memory array 151 arranged in each memory macro.

Peripheral circuit 153 selects one of a plurality of memory cells (which will be described later in detail) included in memory array 151. Data output circuit 152 outputs data on the memory cell selected by peripheral circuit 153 as output data Dout.

Selection of a memory cell by peripheral circuit 153 is performed based on a read signal Rd and an address signal Add output from authentication control circuit 101. Each memory macro is connected to internal bus I-Bus.

BIST control circuit 102 stores output data Dout from memory macros 150 to 180. Upon receipt of a request signal RQ from authentication control circuit 101, BIST control circuit 102 returns output data Dout as memory data MD. Authentication control circuit 101 outputs chip-specific identification information Chip_id as specific identification information on the semiconductor device based on this memory data MD.

Figure 2:
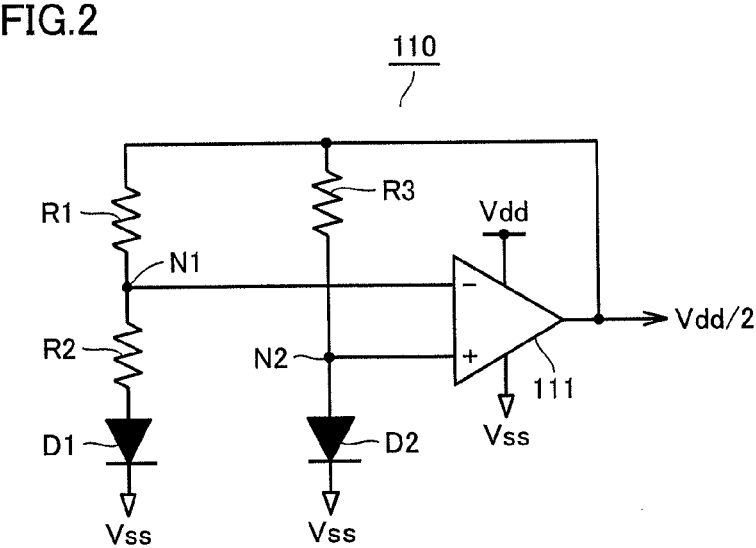
FIG. 2 is a circuit diagram of an intermediate voltage generation circuit according to the first embodiment.

Referring to FIG. 2, a circuit diagram of intermediate voltage generation circuit 110 will be described.

Intermediate voltage generation circuit 110 is a typical band gap reference circuit, to which supply voltages Vdd and Vss are applied. Between the output terminal of an amplifier circuit 111 and supply voltage Vss, resistors R1, R2 and a diode D1 are connected in series in this order. A node N1 between resistors R1 and R2 is connected to the inverting input terminal of amplifier circuit 111. Between the output terminal of amplifier circuit 111 and supply voltage Vss, a resistor R3 and a diode D2 are connected in series in this order in parallel with the aforementioned circuit. A node N2 between resistor R3 and the anode of diode D2 is connected to the non-inverting input terminal of amplifier circuit 111.

Figure 3:
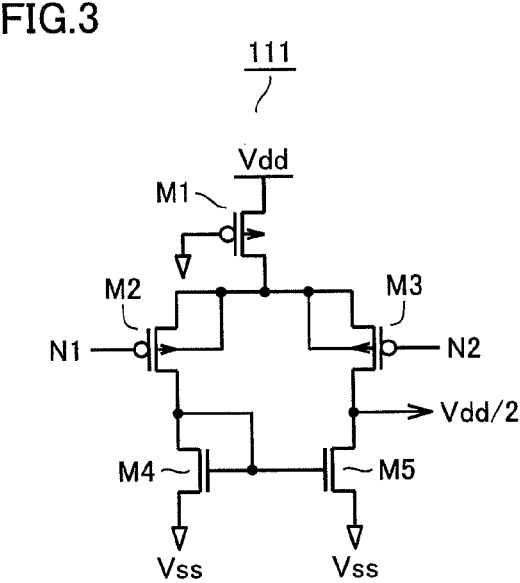
FIG. 3 is a circuit diagram of an amplifier circuit constituting the intermediate voltage generation circuit according to the first embodiment.

Referring to FIG. 3, a specific circuit configuration of amplifier circuit 111 will be described.

Amplifier circuit 111 is a current mirror type differential amplifier circuit. A p-type MOSFET (Metal-Oxide-Semiconductor Field-Effect Transistor) M1 is a constant current source that operates in a saturation region. Supply voltage Vdd is applied to its source, and supply voltage Vss is applied to its gate. Hereinafter, the "p-type MOS transistor" will be referred to as a "p-type transistor." An n-type MOSFET will be similarly referred to as an n-type transistor. Both the transistors may also be simply referred to as MOS transistors.

A p-type transistor M2 has its source connected to the drain of a p-type transistor M1 and its gate serving as inverting input terminal N1. A p-type transistor M3 also has its source connected to the drain of p-type transistor M1 and its gate serving as non-inverting input terminal N2. P-type transistors M2 and M3 have their drains connected to the drains of n-type transistors M4 and M5, respectively.

Supply voltage Vss is applied to the sources of n-type transistors M4 and M5, and n-type transistor M4 has its gate and drain connected to the gate of n-type transistor M5 in common. Therefore, n-type transistors M4 and M5 operate as a current mirror circuit. This current mirror circuit is a current mirror type differential amplifier circuit, and receives differential signals applied to non-inverting input terminal N2 and inverting input terminal N1 to output intermediate voltage Vdd/2 from a common node between the drains of p-type transistor M3 and n-type transistor M5.

The value of this intermediate voltage Vdd/2 is set appropriately in intermediate voltage generation circuit 110 of FIG. 2 based on the values of resistors R1, R2 and R3. In the present first embodiment, the value of intermediate voltage Vdd/2 shall be equal to the value obtained by dividing the difference between supply voltages Vdd and Vss by 2.

Figure 4:
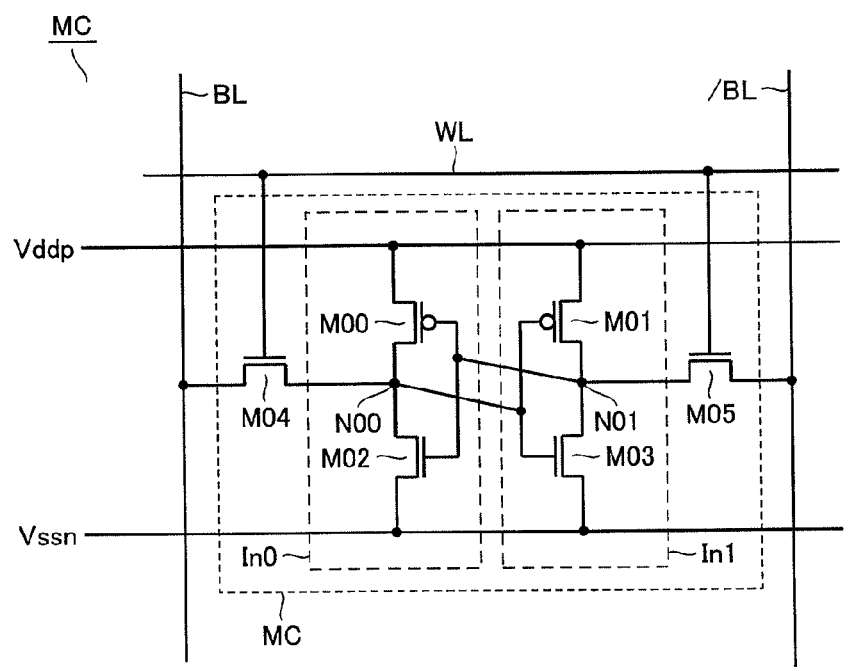
FIG. 4 is a circuit diagram of a memory cell according to the first embodiment.

Referring to FIG. 4, a configuration of a memory cell MC included in memory array 151 shown in FIG. 1 will be described.

Memory cell MC includes cross-coupled inverters In0 and In1, an n-type transistor M04 connected between an output node N00 of inverter In0 and a bit line BL, and an n-type transistor M05 connected between an output node N01 of inverter In1 and a bit line /BL.

Inverter In0 includes a p-type transistor M00 and an n-type transistor M02. P-type transistor M00 has its source connected to cell power line Vddp, and n-type transistor M02 has its source connected to cell power line Vssn. P-type transistor M00 and n-type transistor M02 have their drains connected in common as output node N00.

Inverter In1 includes a p-type transistor M01 and an n-type transistor M03. P-type transistor M01 has its source connected to cell power line Vddp, and n-type transistor M03 has its source connected to cell power line Vssn. P-type transistor M01 and n-type transistor M03 have their drains connected in common as output node N01.

P-type transistor M00 and n-type transistor M02 constituting inverter In0 have their gates connected in common to output node N01. P-type transistor M01 and n-type transistor M03 constituting inverter In1 have their gates connected in common to output node N00.

These cross-coupled inverters In0 and In1 constitute a latch circuit. Output node N00 or N01 is held at supply voltage Vss or Vdd, and the nodes store data while maintaining a complementary relation with their output nodes. In the present specification, output nodes N00 and N01 will be hereinafter also referred to as storage nodes N00 and N01, respectively.

N-type transistors M04 and M05 have their gates connected to a word line WL. Rising of the electric potential at word line WL brings n-type transistors M04 and M05 into a conducting state, so that data is read out from storage nodes N00 and N01 to the respective bit lines, or data is written into storage nodes N00 and N01 from respective bit lines.

Figure 5:
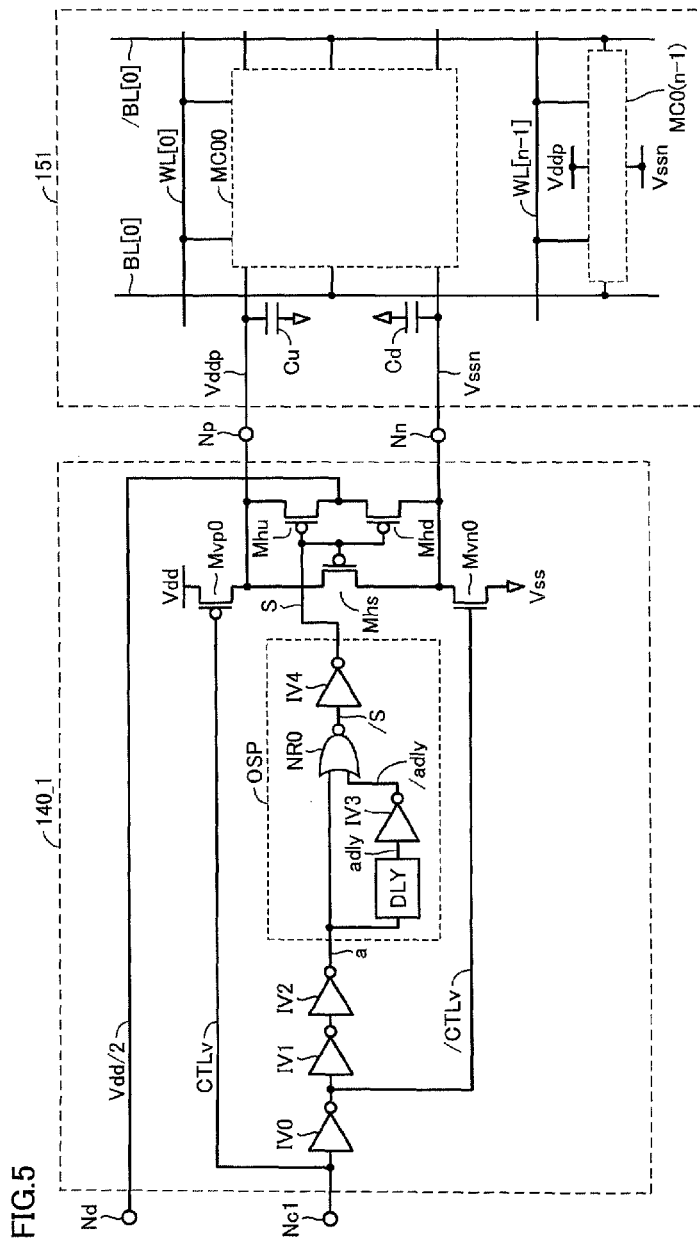
FIG. 5 is a detailed circuit diagram of a power supply control circuit and a memory array according to the first embodiment.

Referring to FIG. 5, a detailed configuration of power supply control circuit 140_1 and memory array 151 according to the first embodiment of the present invention will be described.

Power supply control circuit 140_1 has input node Nc1, intermediate voltage input node Nd and power supply voltage output nodes Nn, Np. An n-type transistor Mvn0 has its drain connected to power supply voltage output node Nn, and supply voltage Vss is applied to its source. A p-type transistor Mvp0 has its drain connected to power supply voltage output node Np, and supply voltage Vdd is applied to its source. N-type transistor Mvn0 and p-type transistor Mvp0 have their drains connected through a p-type transistor Mhs.

Power supply voltage output nodes Nn and Np are connected to the drains of p-type transistors Mhd and Mhu, respectively. P-type transistors Mhd and Mhu have their sources connected in common to intermediate voltage input node Nd. P-type transistors Mhd, Mhu and Mhs have their gates connected in common, and a signal S which will be described later is applied thereto.

Authentication control signal CTLv applied to input node Nc1 is applied to the gate of p-type transistor Mvp0 and inverter IV0. Inverter IV0 inverts the logic level of authentication control signal CTLv to output a signal /CTLv to the gate of n-type transistor Mvn0. Inverters IV0, IV1 and IV2 are connected sequentially to constitute a three-stage inverter, which inverts the logic level of authentication control signal CTLv to generate a signal a.

Signal a output from inverter IV2 is input to a pulse generation circuit OSP. Pulse generation circuit OSP has a delay circuit DLY, inverter IV3, a NOR circuit NR0, and inverter IV4. Delay circuit DLY delays signal a by a delay time Tdly to output a signal adly. Inverter IV3 inverts the logic level of signal adly to output a signal /adly. NOR circuit NR0 obtains the NOR logic of signals a and /adly to output a signal /S. Inverter IV4 inverts the logic level of signal /S to output signal S.

Memory array 151 has a multi-bit memory cells obtained by arranging memory cells MC in an array along bit lines BL and /BL or word line WL, or along both the bit lines and word line. In FIG. 5, memory cells from a memory cell MC00 (word address: 0, bit address: 0) to a memory cell MC0(n−1) (word address: 0, bit address: (n−1)) are arranged only along the bit lines. It is noted that respective memory cells MC00 to MC0(n−1) will be generically called memory cell MC.

Supply voltages Vdd and Vss output from power supply control circuit 140_1 are applied to memory cell MC through cell power lines Vddp and Vssn, respectively. Cell power lines Vssn and Vddp are routed to each memory cell in memory array 151. In memory array 151 shown in FIG. 5, a bit line pair has a configuration corresponding to 1-bit data. In a memory cell array having bit line pairs for multi-bit data along the word line, each of cell power lines Vssn and Vddp extends along word line WL to connect to each memory cell.

Parasitic capacitances of cell power lines Vssn and Vddp are referred to as a parasitic capacitance Cd and a parasitic capacitance Cu, respectively. Although not shown in FIG. 5, cell power lines Vssn and Vddp have parasitic resistances, respectively.

Figure 6:
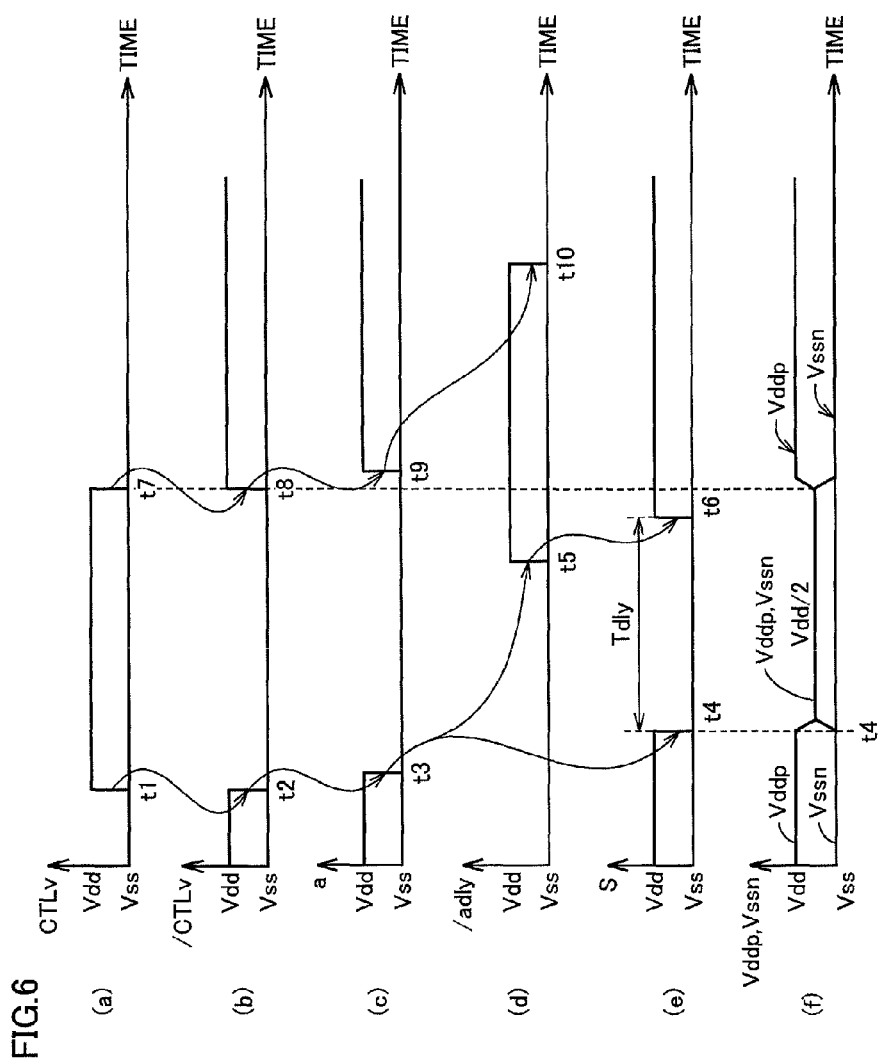
FIG. 6 is an operation timing chart of the power supply control circuit according to the first embodiment.

Referring to FIG. 6, the operation of power supply control circuit 140_1 will be described.

As shown in FIG. 6 at (a), at time t1, authentication control signal CTLv is changed from the low level to the high level in response to authentication request signal Arq. P-type transistor Mvp0 receiving authentication control signal CTLv at its gate is changed from the conducting state to the non-conducting state. Therefore, after time t1, supply of supply voltage Vdd to cell power line Vddp is interrupted.

As shown in FIG. 6 at (b), at time t2, inverter IV0 receiving authentication control signal CTLv inverts the input signal to output an output signal /CTLv. N-type transistor Mvn0 receiving this signal at its gate is changed from the conducting state to the non-conducting state. Therefore, after time t2, supply voltage Vss supplied to cell power line Vssn is interrupted.

Signal /CTLv passes through inverters IV1 and IV2, and output signal a is changed from the high level to the low level at time t3 shown in FIG. 6 at (c). As shown in FIG. 6 at (c) and (d), signal a is changed to the low level at time t3, and signal /adly is changed to the high level at time t5. During the period from time t3 to time t5, there are circuit delays caused by delay circuit DLY and inverter IV3. NOR circuit NR0 obtains the NOR logic of signals a and /adly, and brings signal /S into the high level during a period in which both the signals are at the low level.

As shown in FIG. 6 at (e), in a delay time Tdly from time t4 to time t6, inverter IV4 inverts input signal /S to obtain output signal S and maintains the low level. This low level period is a period obtained by shifting the above period from t3 to time t5 by the circuit delays caused by NOR circuit NR0 and inverter IV4, and is dominantly determined by delay time Tdly caused by delay circuit DLY. This is because the delay caused by delay circuit DLY is extremely longer than the circuit delay caused by inverter IV3. Therefore, in the following description, the low level period of signal S will be regarded as being substantially equal to delay time Tdly produced by delay circuit DLY.

As shown in FIG. 6 at (f), when signal S is changed from the high level to the low level at time t4, the electric potentials at cell power lines Vssn and Vddp start rising and dropping toward intermediate voltage Vdd/2 from supply voltages Vss and Vdd, respectively. The change of signal S to the low level brings p-type transistor Mhs shown in FIG. 5 into the conducting state to short-circuit power supply voltage output nodes Nn and Np. P-type transistors Mhu and Mhd are also brought into the conducting state. As a result, intermediate voltage Vdd/2 generated by intermediate voltage generation circuit 110 is supplied to power supply voltage output nodes Nn and Np.

As shown in FIG. 6 at (a), (b) and (e), in delay time Tdly from time t4 to time t6, authentication control signal CTLv and signal /CTLv are maintained at the high level and the low level, respectively, and signal S is maintained at the low level. Therefore, the electric potentials at cell power lines Vssn and Vddp are maintained at intermediate voltage Vdd/2.

After certain delay time Tdly, signal S is changed from the low level to the high level. This change occurs because signal /adly is changed to the high level at time t5. Accordingly, p-type transistors Mhs, Mhu and Mhd are brought into the non-conducting state. As shown in FIG. 6 at (a), (b) and (c), authentication control signal CTLv is changed from the high level to the low level at time t7, and signals /CTLv and a are inverted in logic level at time t8 and time t9, respectively. Therefore, p-type transistor Mvp0 and n-type transistor Mvn0 are changed from the non-conducting state to the conducting state at time t7 and time t8, respectively.

P-type transistor Mvp0 in the conducting state raises the electric potential at cell power line Vddp from intermediate voltage Vdd/2 to supply voltage Vdd. N-type transistor Mvn0 in the conducting state drops the electric potential at cell power line Vssn from intermediate voltage Vdd/2 to supply voltage Vss. It is noted that in FIG. 6 at (a) and (b), the time difference between time t7 and time t8 is a circuit delay caused by inverter IV0, which is shorter than the circuit delay caused by delay circuit DLY or the like. Thus, time t7 and time t8 can be regarded as substantially the same time.

Figure 7:
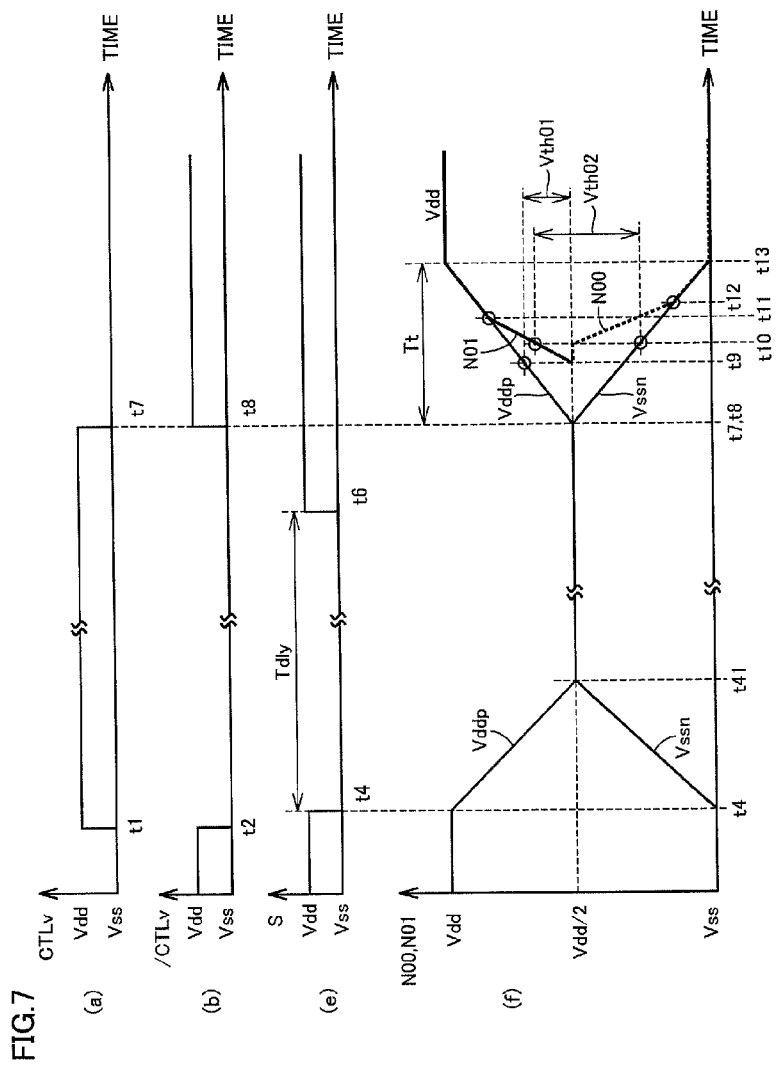
FIG. 7 is an operation timing chart of the identification information generation circuit included in the semiconductor device according to the first embodiment.

Referring to FIG. 7, the operation of identification information generation circuit 100_1 included in the semiconductor device according to the first embodiment of the present invention will be described.

In FIGS. 7, (a), (b), (e), and (f) correspond to (a), (b), (e), and (f) in FIG. 6, respectively. As shown in FIG. 7 at (e), in delay time Tdly from time t4 to time t6, signal S is maintained at the low level.

As shown in FIG. 7 at (f), at time t4, the electric potentials at cell power lines Vssn and Vddp start rising and dropping from supply voltages Vss and Vdd to intermediate voltage Vdd/2, respectively, and reach intermediate voltage Vdd/2 at time t41. In the period from time t41 to time t7 in which authentication control signal CTLv is maintained at the high level, the electric potentials at cell power lines Vssn and Vddp are maintained at intermediate voltage Vdd/2. It is noted that, as already described, time t8 is substantially the same time as time t7, and is regarded as the same time in FIG. 7.

Referring to FIG. 4, the electric potentials at storage nodes N00 and N01 of memory cell MC just before time t7 will be described. In the period from time t4 to time t13, the electric potential at word line WL is set at supply voltage Vss. That is, n-type transistors M04 and M05 are in the non-conducting state, and storage nodes N00 and N01 of memory cell MC are electrically disconnected from bit lines BL and /BL, respectively.

During delay time Tdly from time t4 to time t6, signal S is at the low level, and intermediate voltage Vdd/2 is applied to cell power lines Vssn and Vddp. As a result, the electric potentials at the drain, source and gate of each of four MOS transistors constituting inverters In0 and In1 in memory cell MC are maintained at intermediate voltage Vdd/2. The electric potentials at storage nodes N00 and N01 in memory cell MC also reach intermediate voltage Vdd/2.

At this time, the case in which the electric potential at storage node N00 or N01 becomes higher or lower than intermediate voltage Vdd/2 by a threshold voltage of any of the four MOS transistors is of concern. However, current leakage (gate leakage and subthreshold leakage) occurs in the MOS transistors, so that the electric potentials at two storage nodes N00 and N01 reach intermediate voltage Vdd/2.

As shown in FIG. 7, in the period of transition time Tt from time t7 to time t13, the electric potentials at cell power lines Vssn and Vddp are returned to their original potentials, supply voltages Vss and Vdd, respectively, from intermediate voltage Vdd/2.

Description of the chip-specific identification information generating function of the semiconductor device according to the first embodiment of the present invention is premised on the following relationship as an example. A threshold voltage Vth00 of p-type transistor M00 constituting memory cell MC is higher than a threshold voltage Vth01 of p-type transistor M01, and a threshold voltage Vth03 of n-type transistor M03 is higher than a threshold voltage Vth02 of n-type transistor M02. Furthermore, the threshold voltage of an n-type transistor shall be higher than that of a p-type transistor. That is, the following relationship shall be a precondition.

Vth01<Vth00<Vth02<Vth03

Here, the sign "<" is a sign of inequality indicating that the left part is smaller than the right part.

It is noted that this precondition is a condition for simplifying the description of the present embodiment, and is not an essential condition. The threshold voltage (Vthn) of an n-type transistor has a positive value, while the threshold voltage (Vthp) of a p-type transistor has a negative value. In the present specification and the accompanying drawings, the expression "the threshold voltage of a p-type transistor" (e.g., Vth00) refers to the absolute value of the threshold voltage unless otherwise specifically stated.

In FIG. 7 at (f), at time t7, the electric potentials at cell power lines Vssn and Vddp are intermediate voltage Vdd/2, and drop and rise after time t7, respectively. On the other hand, the gate electric potentials at the four MOS transistors are maintained at intermediate voltage Vdd/2 until the gate-source voltage of these four MOS transistors exceeds any lowest threshold voltage.

Since the sources of n-type transistors (M02, M03) constituting memory cell MC are controlled by cell power line Vssn and the sources of p-type transistors (M00, M01) are controlled by cell power line Vddp, the electric potential difference between the gate and source of the four MOS transistors starts increasing after time t7.

Suppose that the electric potential difference between the gate and source of p-type transistor M01 reaches threshold voltage Vth01 at time t9. This means that p-type transistor M01 having the lowest threshold voltage among the four MOS transistors (M00, M01, M02, and M03) is first brought into the conducting state.

As a result, the electric potential at storage node N01 maintained at intermediate voltage Vdd/2 starts rising at time t9 with the conducting state of p-type transistor M01. On the other hand, p-type transistor M00 whose gate is connected to storage node N01 is maintained in the non-conducting state because the electric potential at storage node N01 (gate electric potential at M00) rises even if the source potential (electric potential at cell power line Vddp) rises.

After time t7, the electric potential at cell power line Vssn also starts dropping from intermediate voltage Vdd/2. This drop in electric potential at cell power line Vssn results in an increase in the source-gate voltage of two n-type transistors (M02, M03).

At time t10, the difference between the electric potential at storage node N01 and the electric potential at cell power line Vssn, that is, the gate-source voltage of n-type transistor M02 reaches threshold voltage Vth02. At this time, the electric potential at storage node N01 has a value exceeding intermediate voltage Vdd/2.

At time t10, the gate electric potential at the other n-type transistor M03 is maintained at intermediate voltage Vdd/2. This is because p-type transistor M00 is in the non-conducting state and the electric potential at storage node N00 is maintained at the value shown at time t7.

At time t10, the electric potential at storage node N00 is maintained at intermediate voltage Vdd/2, and the electric potential at storage node N01 is a value exceeding intermediate voltage Vdd/2. Since threshold voltage Vth02 is lower than threshold voltage Vth03 as a precondition, n-type transistor M02 is brought into the conducting state, and n-type transistor M03 is maintained in the non-conducting state. As a result, the electric potential at storage node N00 maintained at intermediate voltage Vdd/2 starts dropping at time t10 with the conducting state of n-type transistor M02.

Here, even if threshold voltage Vth02 is higher than threshold voltage Vth03, the electric potential difference between storage node N00 and cell power line Vssn is smaller than the electric potential difference between storage node N01 and cell power line Vssn. Therefore, n-type transistor M02 is brought into the conducting state earlier than n-type transistor M03. The above-described operation will be established under the condition that the difference between variations in threshold voltages Vth03 and Vth02 is smaller than at least threshold voltage Vth01.

In addition, a variation in threshold voltage of an n-type transistor will not become higher than the threshold voltage of a p-type transistor. Furthermore, also when an n-type transistor among the four MOS transistors has the minimum threshold voltage, the operation is achieved similarly to the above description, and data stored in a memory cell appears.

At time t11, the electric potential at storage node N01 and the electric potential at cell power line Vddp become equal, and after time t11, the electric potentials at storage node N01 and cell power line Vddp transition to be equal. At time t13, the electric potential at storage node N01 reaches supply voltage Vdd.

Similarly, at time t12, the electric potential at storage node N00 and the electric potential at cell power line Vssn become equal, and after time t12, storage node N00 and cell power line Vssn transition to be equal. At time t13, the electric potential at storage node N00 reaches supply voltage Vss.

After time t13, supply voltages Vss and Vdd are applied to cell power lines Vssn and Vddp, respectively. Data (electric potential information) at storage nodes N00 and N01 held by each memory cell MC constituting memory array 151 is selected by word line WL and output to bit lines BL and /BL. As shown in FIG. 1, data output circuit 152 outputs data in each memory cell MC as output data Dout to BIST control circuit 102 based on the data in bit lines BL and /BL.

In response to request signal RQ from authentication control circuit 101, BIST control circuit 102 returns the data in each memory cell MC to authentication control circuit 101 as memory data MD. Authentication control circuit 101 outputs this memory data MD as chip-specific identification information Chip_id.

As the above description indicates, power supply control circuit 140_1 sets the electric potentials at the source, drain and gate of each of the four MOS transistors in the latch circuit constituting memory cell MC at intermediate voltage Vdd/2 until a predetermined time set by delay time Tdly elapses. Then, power supply control circuit 140_1 raises the electric potentials at the sources of the p-type transistors of inverters In0 and In1 from intermediate voltage Vdd/2 to supply voltage Vdd.

Similarly, power supply control circuit 140_1 drops the electric potentials at the sources of the n-type transistors of inverters In0 and In1 from intermediate voltage Vdd/2 to supply voltage Vss.

As a result, storage node N00 or N01 connected to the drain of a MOS transistor having the minimum threshold voltage among the four MOS transistors is connected to the source of that MOS transistor. For example, when the threshold voltage of p-type transistor M01 included in inverter In1 is the minimum, the electric potential at storage node N01 starts rising from intermediate voltage Vdd/2 toward supply voltage Vdd.

Among the four MOS transistors in the latch circuit constituting a memory cell, when a MOS transistor (e.g., p-type) having the minimum threshold voltage is brought into the conducting state, another MOS transistor of the other conductivity type (e.g., n-type) of an inverter paired with an inverter to which the MOS transistor having the minimum threshold voltage belongs starts conduction.

The electric potentials at storage nodes N00 and N01 which are the drains of these transistors having started conduction become the electric potentials at the respective sources. Therefore, data generated in memory cell MC is determined by the variations in the threshold voltages of the MOS transistors in inverters In0 and In1 constituting the memory cell. Since these threshold voltages vary at random, data appearing in the memory cell is random data. Furthermore, since this data is determined by the threshold voltages of the four MOS transistors constituting the two inverters in the memory cell, reproducibility of generating identical data when the operation is performed again is high.

[First Modification of First Embodiment]

Figure 8:
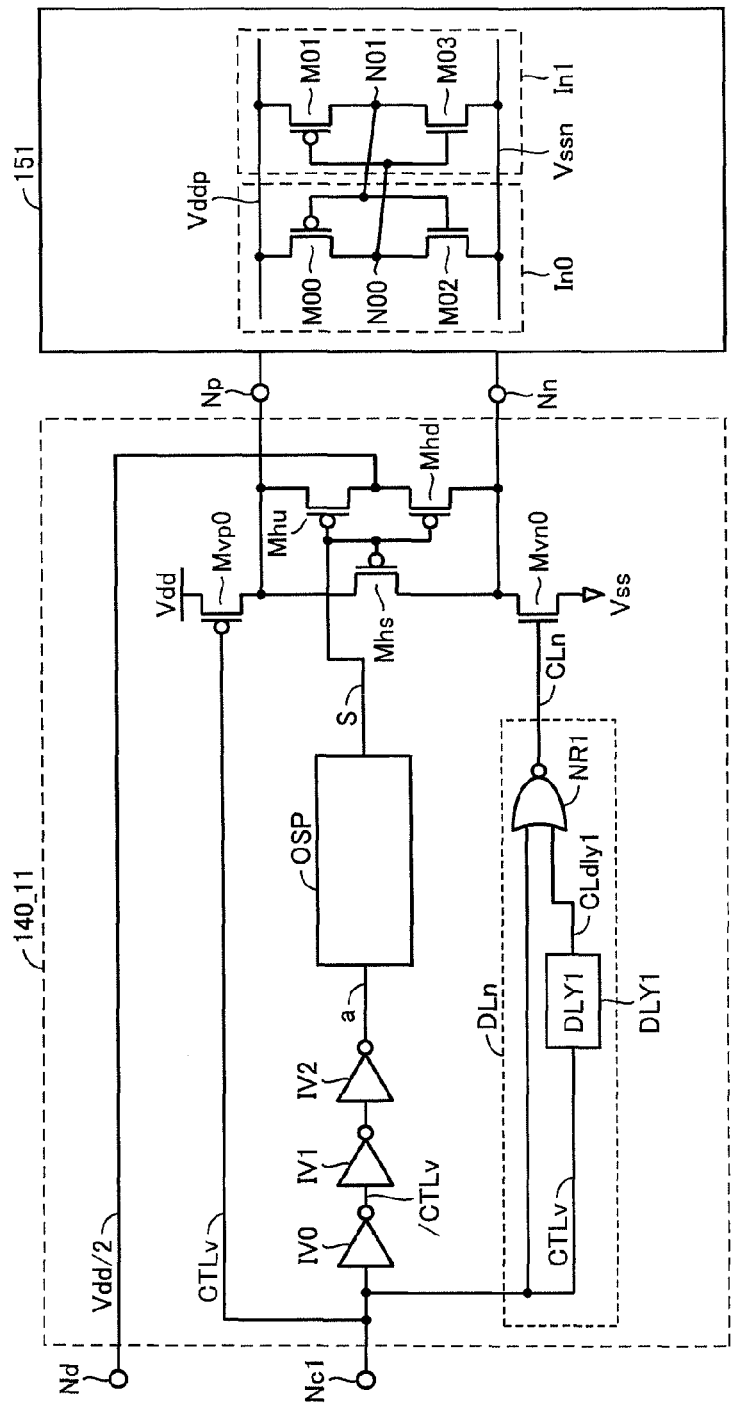
FIG. 8 is a circuit diagram of a power supply control circuit according to a first modification of the first embodiment.

Referring to FIG. 8, a circuit block configuration of a power supply control circuit 140_11 according to a first modification of the first embodiment of the present invention will be described.

Power supply control circuit 140_11 has a configuration in which a delay control circuit DLn is added to power supply control circuit 140_1 according to the first embodiment shown in FIG. 5. In power supply control circuit 140_11, functional blocks, transistors, signal lines and the like denoted by the same reference characters as those shown in FIG. 5 are identical in function and configuration to those of power supply control circuit 140_1, and description thereof will not be repeated.

In this modification, as an operation for generating random data in a memory cell, a time difference is provided between the timing at which the electric potential at cell power line Vddp rises from intermediate voltage Vdd/2 to supply voltage Vdd and the timing at which the electric potential at cell power line Vssn drops from intermediate voltage Vdd/2 to supply voltage Vss. Accordingly, the factor that determines data appearing in storage nodes N00 and N01 depends only on the difference between the threshold voltages of two p-type transistors, which further increases reproducibility of data appearance.

Delay control circuit DLn includes a delay circuit DLY1 and a NOR circuit NR1. Delay circuit DLY1 delays authentication control signal CTLv applied to input node Nc1 by delay time Tdly1 to output a signal CLdly1. NOR circuit NR1 obtains the NOR logic of authentication control signal CTLv and signal CLdly1, and outputs the result as a signal CLn.

Memory array 151 has the same configuration as memory array 151 shown in FIG. 5. Memory cell MC included in memory array 151 has the same configuration as memory cell MC shown in FIG. 4, and only inverters In0 and In1 in memory cell MC are shown in FIG. 8.

Figure 9:
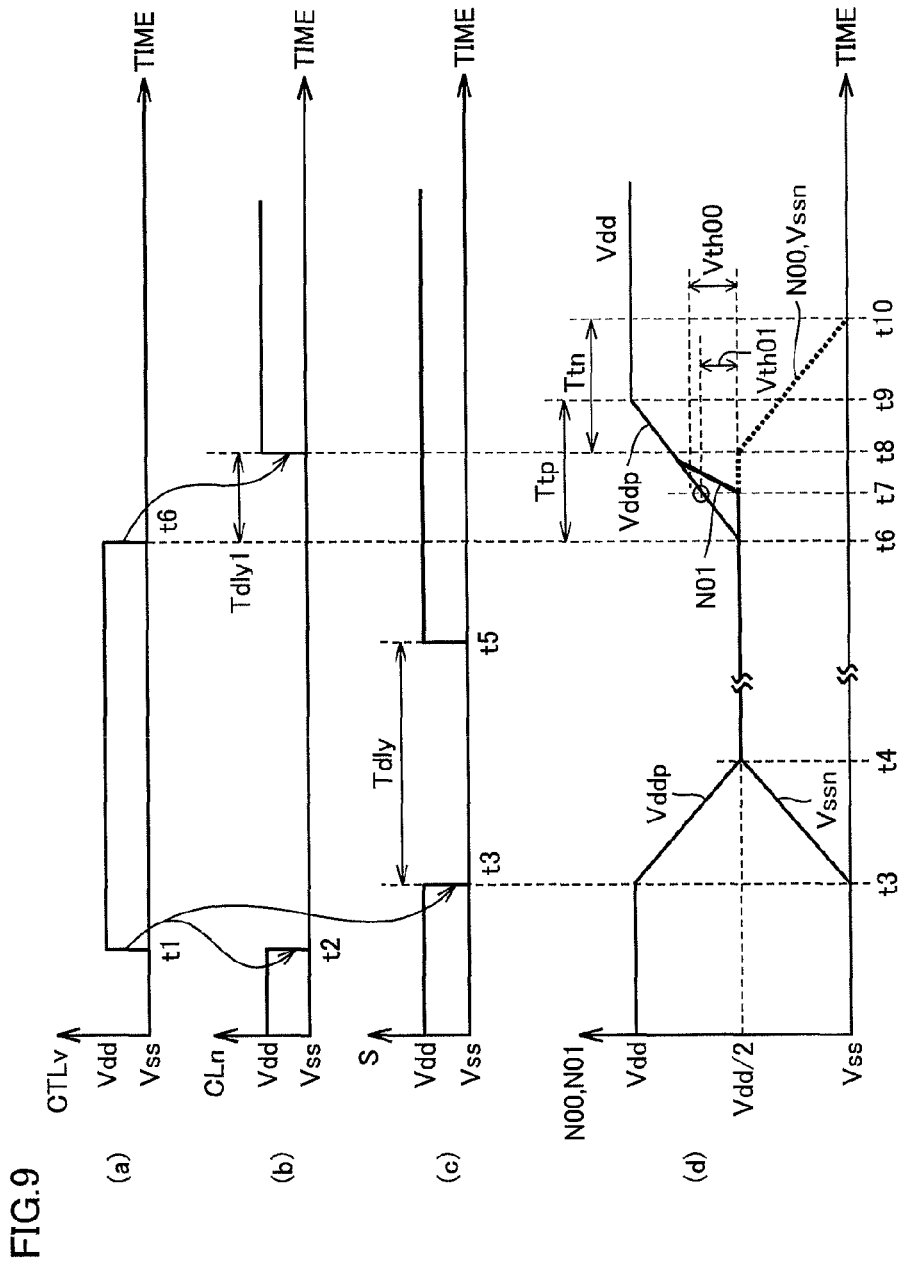
FIG. 9 is an operation timing chart of the power supply control circuit according to the first modification of the first embodiment.

FIG. 9 shows schematic operation waves of power supply control circuit 140_11 according to the first modification of the first embodiment shown in FIG. 8. Referring to FIG. 9, the operation of power supply control circuit 1z40_11 will be described.

As shown in FIG. 9 at (a), authentication control signal CTLv is changed from the low level to the high level at time t1 in response to authentication request signal Arq. P-type transistor Mvp0 receiving this authentication control signal CTLv at its gate interrupts supply voltage Vdd supplied to power supply voltage output node Np.

As shown in FIG. 9 at (a) and (b), authentication control signal CTLv is changed from the low level to the high level at time t1, and output signal CLn of NOR circuit NR1 is changed from the high level to the low level. At this time, the delay from time t1 to time t2 is the circuit delay caused by NOR circuit NR1. With this change in signal CLn, n-type transistor Mvn0 interrupts supply of supply voltage Vss to power supply voltage output node Nn.

When authentication control signal CTLv is changed from the low level to the high level at time t1, pulse generation circuit OSP changes signal S, having been at the high level similarly to FIG. 5, to the low level and maintains the low level in the period of delay time Tdly from time t3 to time t5.

As shown in FIG. 9 at (d), at time t3, the electric potential at cell power line Vssn starts rising from supply voltage Vss, and reaches intermediate voltage Vdd/2 at time t4. Similarly, at time t3, the electric potential at cell power line Vddp starts dropping from supply voltage Vdd, and reaches intermediate voltage Vdd/2 at time t4. The electric potentials at cell power lines Vssn and Vddp reach intermediate voltage Vdd/2 simultaneously at time t4 in this figure. Actually, however, they do not necessarily reach Vdd/2 simultaneously, and the electric potentials at both the cell power lines should only reach intermediate voltage Vdd/2 by time t6 at which the next operation is started.

At time t6, authentication control signal CTLv is changed from the high level to the low level, and p-type transistor Mvp0 receiving authentication control signal CTLv at its gate starts supply of supply voltage Vdd to power supply voltage output node Np. Therefore, the electric potentials at the sources of p-type transistors M00 and M01 of memory cell MC rise from intermediate voltage Vdd/2 toward supply voltage Vdd. On the other hand, when signal CLn is changed from the low level to the high level at time t8, the electric potential at cell power line Vssn having been maintained at intermediate voltage Vdd/2 starts dropping.

The above-described changes in the electric potential at cell power line Vssn will be described below. Attention is focused on delay control circuit DLn shown in FIG. 8. As shown in FIG. 9 at (a) and (b), authentication control signal CTLv is changed from the high level to the low level at time t6. NOR circuit NR1 maintains output signal CLn at the low level until both authentication control signal CTLv and delay signal CLdly1 are changed to the low level. When authentication control signal CTLv is changed from the high level to the low level at time t6, delay signal CLdly1 is maintained at the high level until time t8 at which delay time Tdly1 elapses. Therefore, n-type transistor Mvn0 receiving output signal CLn at its gate is maintained in the non-conducting state.

At time t8 at which delay time Tdly1 elapses from time t6, delay signal CLdly1 is changed from the high level to the low level. As a result, output signal CLn of NOR circuit NR1 is changed from the low level to the high level, and n-type transistor Mvn0 is brought into the conducting state. The electric potential at cell power line Vssn starts dropping from intermediate voltage Vdd/2 to the electric potential at supply voltage Vss through n-type transistor Mvn0.

In FIG. 9 at (d), the changes in electric potentials at storage nodes N00 and N01 of the memory cell after time t6 will be described with reference to the circuit diagram of inverters In0 and In1 of FIG. 8. Here, for ease of description, it is assumed that threshold voltage Vth01 of p-type transistor M01 of inverter In1 is lower than threshold voltage Vth00 of p-type transistor M00 of inverter In0. It is noted that the electric potentials at the source, drain and gate of each of the four transistors constituting inverters In0 and In1 at time t6 are all intermediate voltage Vdd/2.

Upon receipt of the electric potential at cell power line Vddp starting rising at time t6 and Vdd/2 at which storage node N00 is maintained, the electric potential difference between the source and gate of p-type transistor M01 reaches threshold voltage Vth01 of p-type transistor M01 at time t7. This is because p-type transistor M01 reaches the threshold voltage earlier than p-type transistor M00 based on the aforementioned assumption, Vth01<Vth00. Therefore, p-type transistor M01 is brought into the conducting state, and the electric potential at storage node N01 starts rising at time t7. At time t9 at which a transition time Ttp elapses from time t6, the electric potential at storage node N01 reaches supply voltage Vdd.

When signal CLn is changed from the low level to the high level at time t8, n-type transistor Mvn0 is brought into the conducting state, and supply of supply voltage Vss to power supply voltage output node Nn is started. As a result, the electric potential at the sources of n-type transistors M02 and M03 starts dropping from intermediate voltage Vdd/2 toward supply voltage Vss.

At time t8, the gate electric potential at n-type transistor M03 equal to the electric potential at storage node N00 is maintained at intermediate voltage Vdd/2, while the gate electric potential at n-type transistor M02 which is equal to the electric potential at storage node N01 is higher than intermediate voltage Vdd/2. For this reason, when p-type transistor M01 is brought into the conducting state earlier, n-type transistor M02 in inverter In0 paired with and opposite to inverter In1 is brought into the conducting state. At time t10 at which a transition time Ttn elapses from time t8, the electric potential at storage node N00 reaches supply voltage Vss.

The influence of n-type transistor M03 in inverter In1 on the changes in electric potentials at storage nodes N00 and N01 after time t8 will be considered. Threshold voltages of n-type transistors M02 and M03 are denoted by Vth02 and Vth03, respectively. Even if these threshold voltages vary and Vth02>Vth03 or Vth02<Vth03 holds, n-type transistor M02 is brought into the conducting state earlier than n-type transistor M03 and the electric potential at storage node N00 drops to supply voltage Vss, unless the absolute value |Vth02−Vth03| of the difference between the threshold voltages is greater than at least threshold voltage Vth01 of p-type transistor M01.

N-type transistors M02 and M03 are devices manufactured so as to have an equal gate size and an equal property. N-type transistors M02 and M03 are disposed adjacent to each other. Therefore, variations in these threshold voltages caused by manufacturing variation will not become greater than the absolute value |Vth01| of the threshold voltage of p-type transistor M01.

After time t10, data output circuit 152 (see FIG. 1) outputs data in each memory cell MC to BIST control circuit 102 as output data Dout. In response to request signal RQ from authentication control circuit 101, BIST control circuit 102 returns the data in each memory cell MC to authentication control circuit 101 as memory data MD. Authentication control circuit 101 outputs this memory data MD as chip-specific identification information Chip_id.

In power supply control circuit 140_11 according to the first modification of the first embodiment, the source, drain and gate of the four MOS transistors constituting inverters In0 and In1 in memory cell MC are set at an equal electric potential (intermediate voltage Vdd/2). Then, the electric potential at the common source of two p-type transistors M00 and M01 (electric potential at cell power line Vddp) is raised. Of the two p-type transistors, one having a lower threshold voltage is brought into the conducting state. The transistor brought into the conducting state raises the electric potential at storage node N00 or N01.

By the period from time t6 at which the electric potential at cell power line Vddp starts rising to time t8 at which delay time Tdly1 elapses, one of the two p-type transistors (M00 and M01) is brought into the conducting state, and the electric potential at cell power line Vssn is maintained at intermediate voltage Vdd/2. After delay time Tdly1 elapses, the electric potential at cell power line Vssn, which is also the electric potentials at the sources of n-type transistors M02 and M03, is dropped.

Accordingly, random data appearing in a memory cell can be determined only by the variations in the threshold voltages of p-type transistors, and the influence of the threshold voltages of the n-type transistors can be avoided. Moreover, since the factor that determines the data appearing in a memory cell is established by the magnitude correlation between the threshold voltages of two p-type transistors M00 and M01, reproducibility of the data appearing in a storage node is better than in the first embodiment.

As described above, in the description of the present variation, it is assumed that threshold voltage Vth01 of p-type transistor M01 is lower than threshold voltage Vth00 of p-type transistor M00. This assumption is a condition for simply describing the operation of power supply control circuit 140_11 according to the first modification of the first embodiment. It is easily understood that, even if threshold voltages Vth01 and Vth00 do not have the magnitude correlation as assumed above, data appearing in a memory cell is determined based on the magnitude correlation between the threshold voltages of the p-type transistors.

[Second Modification of First Embodiment]

Figure 10:
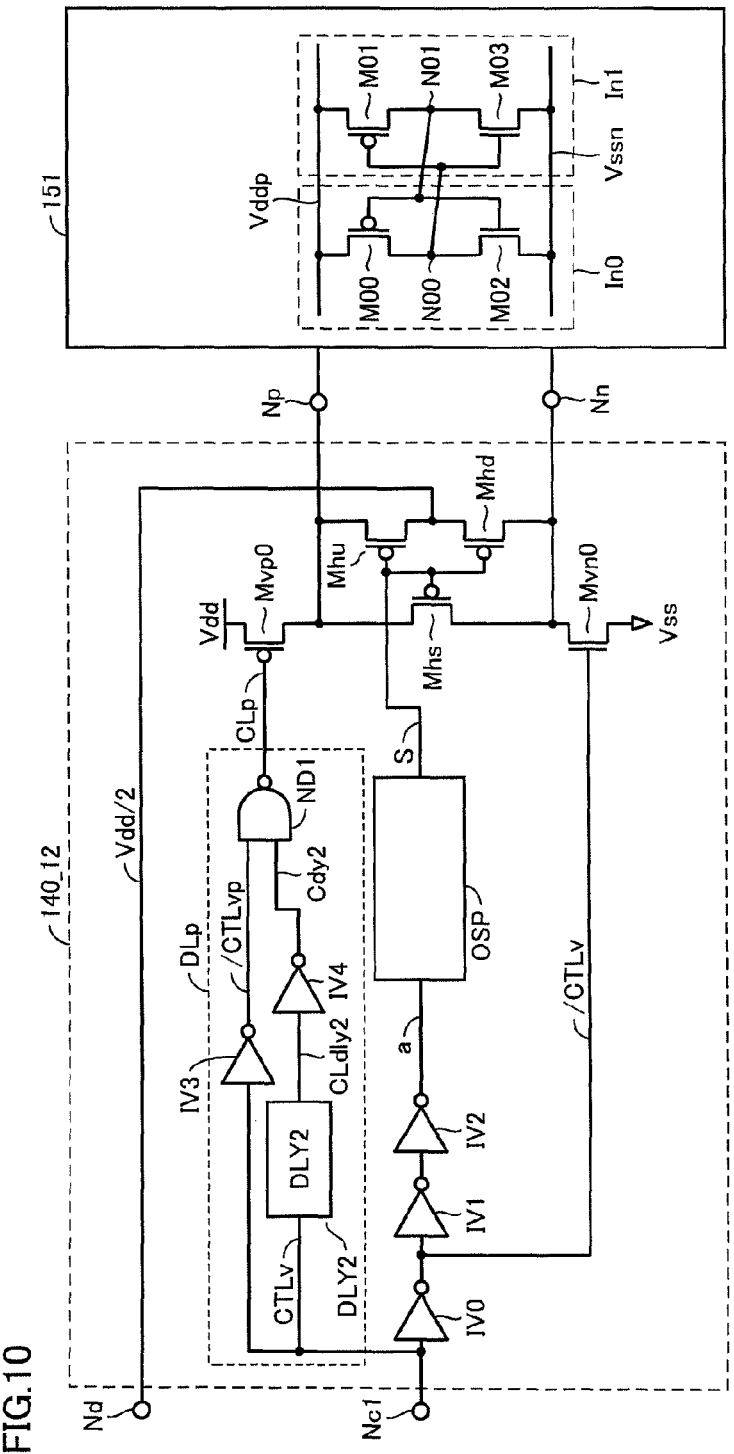
FIG. 10 is a circuit diagram of a power supply control circuit according to a second modification of the first embodiment.

Referring to FIG. 10, a circuit block configuration of a power supply control circuit 140_12 according to a second modification of the first embodiment of the present invention will be described.

Power supply control circuit 140_12 has a configuration in which a delay control circuit DLp is added to power supply control circuit 140_1 according to the first embodiment shown in FIG. 5. In power supply control circuit 140_12, functional blocks, transistors, signal lines and the like denoted by the same reference characters as those shown in FIG. 5 are identical in function and configuration to those of power supply control circuit 140_1, and description thereof will not be repeated.

Delay control circuit DLp has a delay circuit DLY2, inverters IV3, IV4, and a NAND circuit ND1. Delay circuit DLY2 delays authentication control signal CTLv applied to input node Nc1 by a delay time Tdly2 to output a signal CLdly2. Inverter IV3 inverts the logic level of authentication control signal CTLv to output a signal /CTLvp. Inverter IV4 inverts the logic level of signal CLdly2 to output a signal Cdy2. NAND circuit ND1 takes the NAND logic of signals /CTLvp and Cdy2, and outputs an output signal CLp.

Memory array 151 has the same configuration as memory array 151 shown in FIG. 5, and memory cell MC constituting memory array 151 is the same as memory cell MC shown in FIG. 4. Memory cell MC is shown only with inverters In0 and In1 in FIG. 10, but is actually composed of the circuit shown in FIG. 4.

Figure 11:
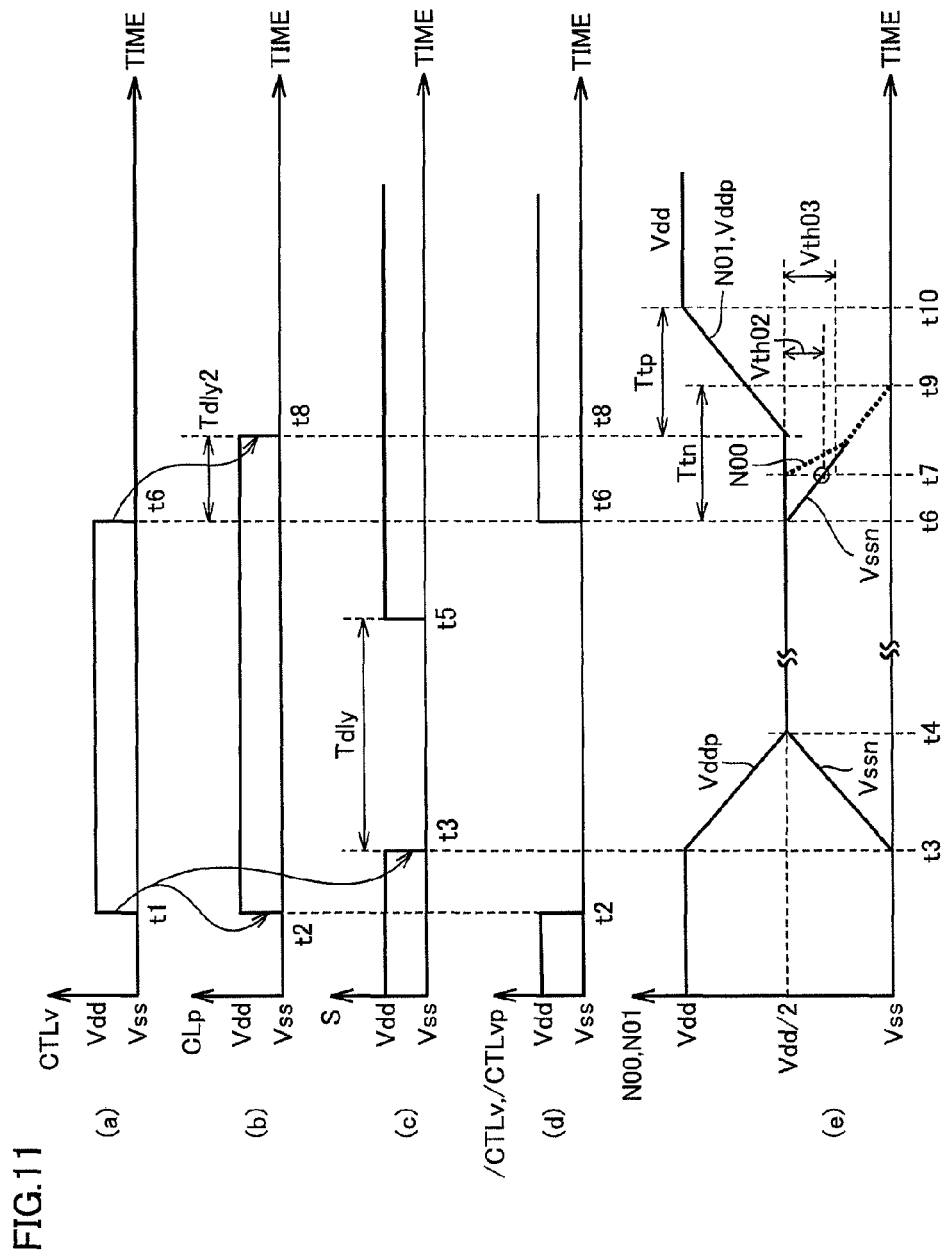
FIG. 11 is an operation timing chart of the power supply control circuit according to the second modification of the first embodiment.

FIG. 11 shows schematic signal waveforms of main nodes in this second modification. Referring to FIG. 11, the operation of power supply control circuit 140_12 will be described.

As shown in FIG. 11 at (a), authentication control signal CTLv is changed from the low level to the high level at time t1 in response to authentication request signal Arq. Output signal /CTLv of inverter IV0 receiving authentication control signal CTLv is changed from the high level to the low level at time t2, as shown in FIG. 11 at (d). As a result, n-type transistor Mvn0 is brought into the non-conducting state, and supply of supply voltage Vss to power supply voltage output node Nn is interrupted.

As shown in FIG. 11 at (a) and (d), at time t1, authentication control signal CTLv is changed to the high level, and output signal /CTLvp of inverter IV3 in delay control circuit DLp is changed to the low level at time t2. Accordingly, output signal CLp of NAND circuit ND1 is changed to the high level. As a result, p-type transistor Mvp0 is brought into the non-conducting state, and supply of the supply voltage Vpp to power supply voltage output node Np is interrupted.

As shown in FIG. 11 at (a) and (c), with the change of authentication control signal CTLv to the high level at time t1, output signal S of pulse generation circuit OSP is maintained at the low level in the period of delay time Tdly from time t3 to time t5. The circuit operation in this period will be described with reference to FIG. 10. When output signal S is changed to the low level, power supply voltage output nodes Nn and Np are short-circuited by p-type transistors Mhs, Mhu and Mhd, and intermediate voltage Vdd/2 is supplied thereto.

As shown in FIG. 11 at (e), after time t3, in memory cell MC, the electric potential at cell power line Vssn rises from supply voltage Vss, and reaches intermediate voltage Vdd/2 at time t4. Similarly, after time t3, the electric potential at cell power line Vddp drops from supply voltage Vdd, and reaches intermediate voltage Vdd/2 at time t4. Actually, even if the electric potentials at cell power lines Vddp and Vssn start to transition toward intermediate voltage Vdd/2 at time t3, both the electric potentials will not reach intermediate voltage Vdd/2 simultaneously at time t4. This is because cell power lines Vddp and Vssn have different values of wiring resistance and parasitic capacitance and differ in source impedance.

There will be no problem even if a difference arises between the setup time until cell power line Vddp reaches intermediate voltage Vdd/2 and the setup time until cell power line Vssn reaches intermediate voltage Vdd/2. The electric potentials at storage nodes N00 and N01 of memory cell MC should only be fixed at intermediate voltage Vdd/2 by the time when the electric potential at cell power line Vssn starts dropping from intermediate voltage Vdd/2 toward supply voltage Vss.

When authentication control signal CTLv is changed from the high level to the low level at time t6, output signal /CTLv of inverter IV0 is changed from the low level to the high level, and n-type transistor Mvn0 is brought into the conducting state. N-type transistor Mvn0 supplies supply voltage Vss to power supply voltage output node Nn, and drops the electric potential at the sources of n-type transistors M02 and M03 of memory cell MC from intermediate voltage Vdd/2 to supply voltage Vss. On the other hand, the electric potential at cell power line Vddp is maintained at intermediate voltage Vdd/2 in the period from time t6 to t8, and rises to supply voltage Vdd after time t8

As shown in FIG. 11 at (a) or (b), signal CLp is changed from the high level to the low level at time t8 after the lapse of delay time Tdly2 from the change of authentication control signal CTLv from the high level to the low level at time t6. This delay time Tdly2 is set up by delay circuit DLY2 constituting delay control circuit DLp shown in FIG. 10. With the change of authentication control signal CTLv from the high level to the low level, output signal /CTLvp of inverter IV3 is changed from the low level to the high level.

On the other hand, in the period from time t6 to time t8 at which delay time Tdly2 elapses, output signal Cdy2 of inverter IV4 is maintained at the low level, and output signal CLp of NAND circuit ND1 is maintained at the high level. Therefore, p-type transistor Mvp0 is maintained at the non-conducting state in the period of this delay time Tdly2. At time t8 at which delay time Tdly2 (exactly, a delay time including the circuit delay caused by inverter IV4) elapses, signal Cdy2 is changed to the high level, and output signal CLp of NAND circuit ND1 is changed to the low level. As a result, p-type MOS transistor Mvp0 is brought into the conducting state, and the electric potential at cell power line Vddp rises toward supply voltage Vdd. Referring to FIG. 11 (e) and the circuit diagram of inverters In0 and In1 of FIG. 10, the electric potentials appearing at storage nodes N00 and N01 of the memory cell after time t6 will be described. Here, for ease of description, it is assumed that threshold voltage Vth02 of n-type transistor M02 constituting memory cell MC is lower than threshold voltage Vth03 of n-type transistor M03. It is noted that the electric potential at the source, drain and gate of each of the four MOS transistors constituting inverters In0 and In1 at time t6 is intermediate voltage Vdd/2.

The electric potential at cell power line Vssn starts dropping at time t6, and reaches threshold voltage Vth02 of n-type transistor M02 at time t7. Since Vth02<Vth03 holds in the above-described assumption, n-type transistor M02 is brought into the conducting state, and n-type transistor M03 is maintained at the non-conducting state. Because n-type transistor M02 is brought into the conducting state, storage node N00 and cell power line Vssn are electrically connected.

After time t7, the electric potential at storage node N00 starts dropping with the electric potential at cell power line Vssn. The conducting state of n-type transistor M02 means that the gate and source of n-type transistor M03 have a common potential, and even if the electric potential at cell power line Vssn drops further, n-type transistor M03 transitions while maintaining the non-conducting state. At time t9 at which transition time Ttn elapses from time t6, the electric potential at storage node N00 reaches supply voltage Vss.

When signal CLp is changed from the high level to the low level at time t8, p-type transistor Mvp0 is brought into the conducting state, and the electric potential at supply voltage Vdd is supplied to power supply voltage output node Np. The electric potential at the sources of p-type transistors M00 and M01 connected to cell power line Vddp starts rising from intermediate voltage Vdd/2 toward supply voltage Vdd.

At time t8, the electric potential at storage node N01 (gate electric potential at p-type transistor M00) is maintained at intermediate voltage Vdd/2. On the other hand, the electric potential at storage node N00 (gate electric potential at p-type transistor M01) is lower than intermediate voltage Vdd/2. After time t8, the electric potential at cell power line Vddp rises toward supply voltage Vdd. When the electric potential difference between cell power line Vddp and storage node N00 exceeds threshold voltage Vth01 of p-type transistor M01, p-type transistor M01 is brought into the conducting state, and the electric potential at storage node N01 starts rising.

Even when Vth00<Vth01 holds for the threshold voltages at this time, p-type transistor M01 is brought into the conducting state earlier than p-type transistor M00 if the difference caused by variations of the threshold voltages (a value obtained by subtracting threshold voltage Vth00 from threshold voltage Vth01) is at least smaller than a value obtained by subtracting the electric potential at storage node N00 from intermediate voltage Vdd/2 at time t8.

When the difference between threshold voltages Vth00 and Vth01 caused by their variations is relatively great, a malfunction can be eliminated by setting delay time Tdly2 to be long. Here, the malfunction means that the factor that determines data appearing in a memory cell is not established by the magnitude correlation between the threshold voltages of two n-type transistors M02 and M03. In the period of transition time Ttp from time t8 to time t10, the electric potential at storage node N01 reaches supply voltage Vdd.

After time t10, data output circuit 152 (see FIG. 1) outputs data in each memory cell MC to BIST control circuit 102 as output data Dout. In response to request signal RQ from authentication control circuit 101, BIST control circuit 102 returns the data in each memory cell MC to authentication control circuit 101 as memory data MD. Authentication control circuit 101 outputs this memory data MD as chip-specific identification information Chip_id.

Power supply control circuit 140_12 according to the second modification of the first embodiment sets the source, drain and gate of the four MOS transistors constituting inverters In0 and In1 included in memory cell MC at an equal electric potential (intermediate voltage Vdd/2). Then, the electric potential at the common source of two n-type transistors M02 and M03 (electric potential at cell power line Vssn) is dropped. Of n-type transistors M02 and M03, one having a lower threshold voltage is brought into the conducting state, and the electric potential at storage node N00 or N01 connected to the drain of that n-type transistor starts dropping.

Delay time Tdly2 is set at a time period in which the electric potential at cell power line Vddp is maintained at intermediate voltage Vdd/2 until one of n-type transistors M02 and M03 is brought into the conducting state after the electric potential at cell power line Vssn starts dropping. After the lapse of delay time Tdly2, the electric potential at the common source of two p-type transistors M00 and M01 (electric potential at cell power line Vddp) constituting inverters In0 and In1 is raised. By these operations, data appearing at storage nodes N00 and N01 of memory cell MC is determined only by the variations in the threshold voltages of n-type transistors M02 and M03 constituting inverters In0 and In1, and is not influenced by the threshold voltages of p-type transistors M00 and M01.

As described above, for ease of description, it is assumed that threshold voltage Vth02 of n-type transistor M02 is lower than threshold voltage Vth03 of n-type transistor M03. It is easily understood that this assumption is not an essential condition in the operation of the present modification, but the data in storage nodes N00 and N01 of memory cell MC is determined by the magnitude correlation between threshold voltages Vth02 and Vth03.

[Second Embodiment]

Figure 12:
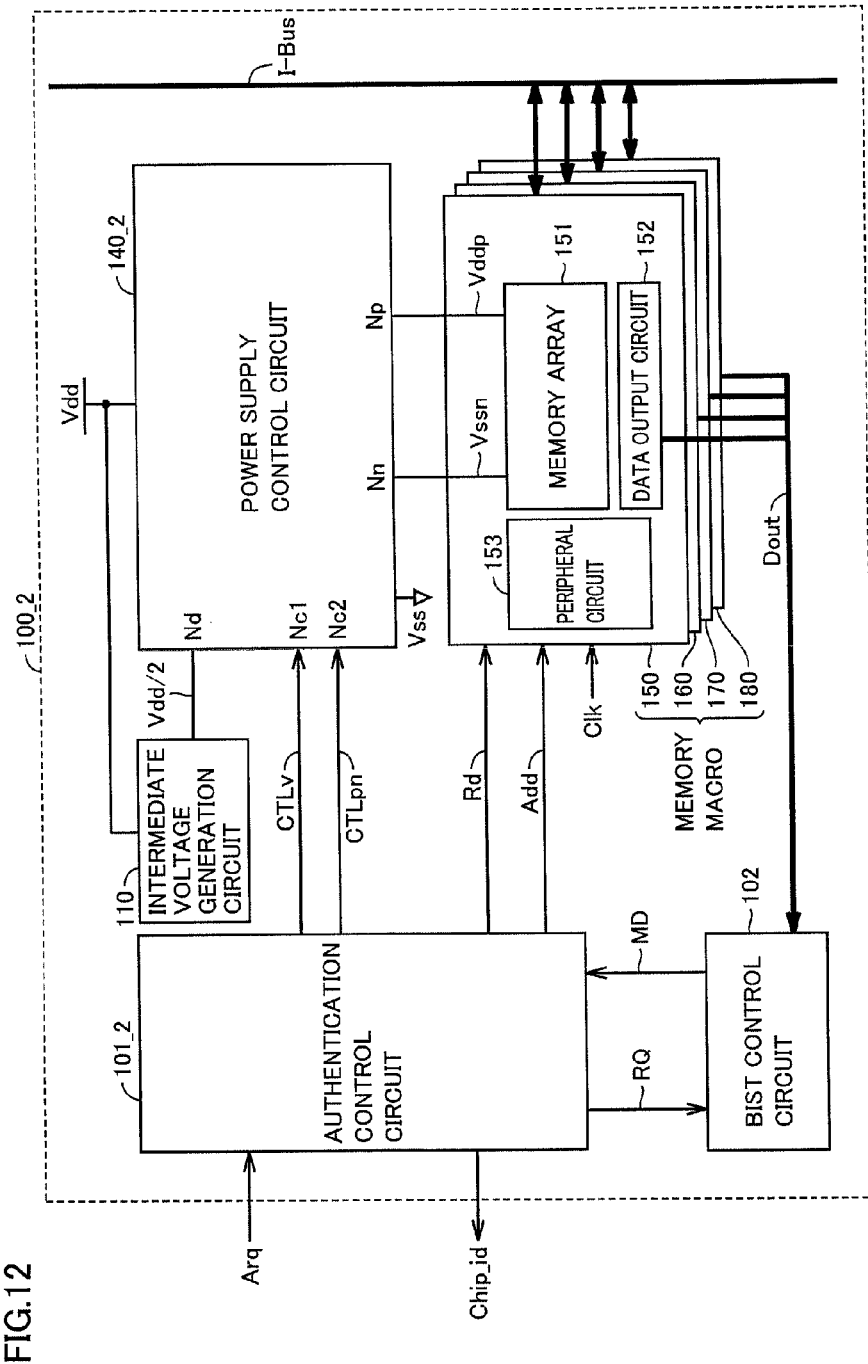
FIG. 12 is a circuit diagram of an identification information generation circuit included in a semiconductor device according to a second embodiment.

Referring to FIG. 12, a configuration of an identification information generation circuit 100_2 included in a semiconductor device according to a second embodiment of the present invention will be described.

Identification information generation circuit 100_2 differs from identification information generation circuit 100_1 of the semiconductor device according to the first embodiment of the present invention shown in FIG. 1 in that identification information generation circuit 100_1 shown in FIG. 1 has authentication control circuit 101 and power supply control circuit 140_1, while identification information generation circuit 100_2 shown in FIG. 12 has an authentication control circuit 101_2 and a power supply control circuit 140_2.

Although authentication control circuits 101 and 101_2 both output authentication control signal CTLv, authentication control circuit 101_2 further outputs a P/N advance control signal CTLpn having a binary value. Although power supply control circuits 140_1 and 140_2 both include input node Nc1, power supply control circuit 140_2 further includes an input node Nc2.

Figure 13:
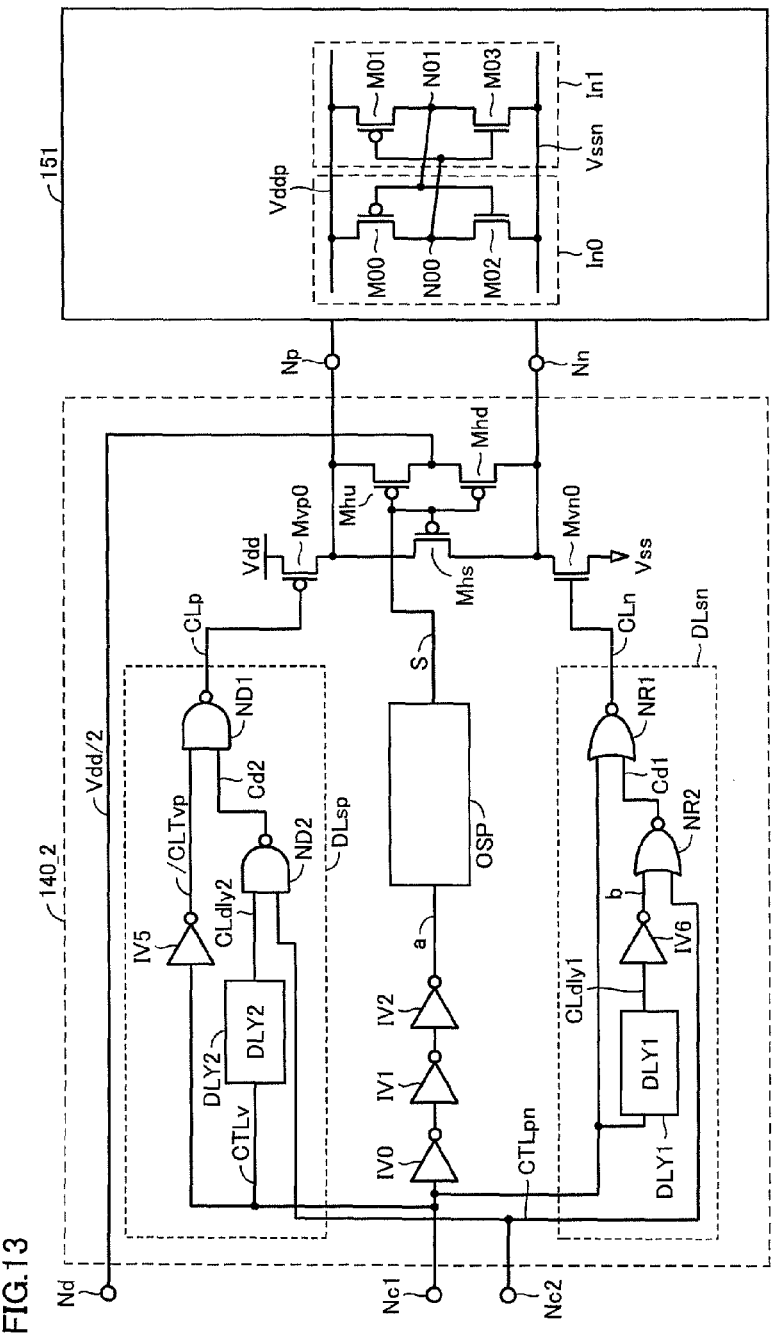
FIG. 13 is a circuit diagram of a power supply control circuit according to the second embodiment.

Referring to FIG. 13, a circuit block configuration of power supply control circuit 140_2 according to the second embodiment of the present invention will be described. Power supply control circuit 140_2 corresponds to the configuration in which functions corresponding to delay control circuit DLn shown in FIG. 8 and delay control circuit DLp shown in FIG. 10 are added to power supply control circuit 140_1 shown in FIG. 5. In power supply control circuit 140_2, functional blocks, transistors, signal lines and the like denoted by the same reference characters as those shown in FIG. 5 are identical in function and configuration to those of power supply control circuit 140_1, and description thereof will not be repeated.

Memory array 151 has the same configuration as memory array 151 shown in FIG. 5. Memory cell MC included in memory array 151 has the same configuration as memory cell MC shown in FIG. 4. In memory cell MC in memory array 151 shown in FIG. 13, only the circuit of inverters In0 and In1 is shown, and n-type transistors M04 and M05 are not shown.

Power supply control circuit 140_2 has input nodes Nc1, Nc2, intermediate voltage input node Nd, power supply voltage output nodes Nn, Np, a delay control circuit DLsn, and a delay control circuit DLsp. P/N advance control signal CTLpn having a binary value is applied to input node Nc2.

Delay control circuit DLsn in power supply control circuit 140_2 includes delay circuit DLY1, an inverter IV6 and NOR circuits NR2, NR1. Delay circuit DLY1 delays authentication control signal CTLv by delay time Tdly1 to output delay signal CLdly1. Inverter IV6 receives delay signal CLdly1, and outputs an inversion signal b. NOR circuit NR2 obtains the NOR logic of P/N advance control signal CTLpn applied to input node Nc2 and delay signal CLdly1, and outputs a signal Cd1. NOR circuit NR1 obtains the NOR logic of authentication control signal CTLv and signal Cd1, and outputs signal CLn to the gate of n-type transistor Mvn0.

Delay control circuit DLsp includes delay circuit DLY2, a NAND circuit ND2, NAND circuit ND1, and an inverter IV5. Delay circuit DLY2 delays authentication control signal CTLv applied to input node Nc1 by delay time Tdly2 to output signal CLdly2. NAND circuit ND2 obtains the NAND logic of P/N advance control signal CTLpn and signal CLdly2, and outputs a signal Cd2. Inverter IV5 receives authentication control signal CTLv, and inverts the logic to output signal /CTLvp. NAND circuit ND1 obtains the NAND logic of signals Cd2 and /CTLvp, and outputs signal CLp to the gate of p-type transistor Mvp0.

Figure 14:
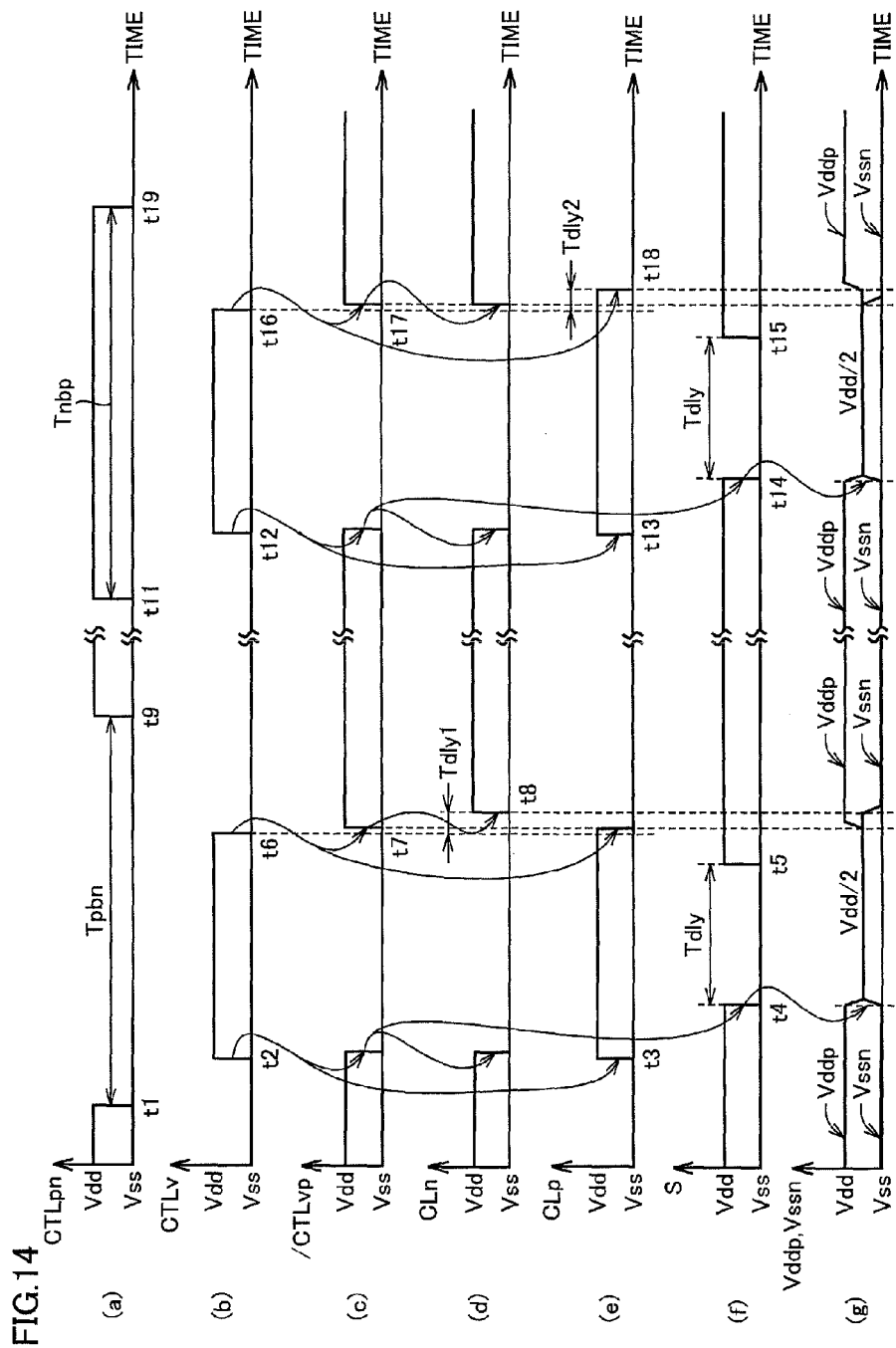
FIG. 14 is an operation timing chart of the power supply control circuit according to the second embodiment.

Referring to FIG. 14, the operation of power supply control circuit 140_2 will be described.

As shown in FIG. 14 at (a), P/N advance control signal CTLpn is set at the low level in a period Tpbn from time t1 to time t9. P/N advance control signal CTLpn is set at the high level in a period Tnbp from time t11 to time t19. This setup order of the low level period and the high level period of P/N advance control signal CTLpn is for illustration of the present embodiment. The setup period of low level and that of the high level of P/N advance control signal CTLpn may be exchanged, and it is not an essential setup for the operation of the present embodiment.

In period Tpbn, one of inputs of NAND circuit ND2 in delay control circuit DLsp (P/N advance control signal CTLpn) is set at the low level. Output signal Cd2 of NAND circuit ND2 is maintained at the high level without depending on the logic level of the other input signal CLdly2. Therefore, as shown in FIG. 14 at (e), output signal CLp of NAND circuit ND1 is subjected to the circuit delays caused by inverter IV5 and NAND circuit ND1, and reaches the logic level of the same phase as authentication control signal CTLv.

Therefore, at time t3, signal CLp is changed from the low level to the high level. When signal CLp is changed to the high level, p-type transistor Mvp0 is brought into the non-conducting state, and supply of supply voltage Vdd to power supply voltage output node Np is interrupted.

As shown in FIG. 14 at (b) and (d), when authentication control signal CTLv is changed from the low level to the high level at time t2, signal CLn from NOR circuit NR1 is changed from the high level to the low level. When signal CLn is changed to the low level, n-type transistor Mvn0 is brought into the non-conducting state, and supply of supply voltage Vss to power supply voltage output node Nn is interrupted.

As shown in FIG. 14 at (b), when authentication control signal CTLv is changed from the low level to the high level at time t2, signal S from inverters IV0, IV1, IV2 and pulse generation circuit OSP is changed from the high level to the low level at time t4 as shown in FIG. 14 (f) and changed from the low level to the high level at time t5 after the lapse of delay time Tdly.

As shown at time t4 in FIG. 14 at (f), signal S is changed from the high level to the low level. As shown in FIG. 14 at (g), the electric potentials at cell power lines Vssn and Vddp transition from supply voltages Vss and Vdd to intermediate voltage Vdd/2, respectively.

As shown in FIG. 14 at (b) and (c), authentication control signal CTLv is changed from the high level to the low level at time t6, and signal CLp from inverter IV5 and NAND circuit ND1 is changed from the high level to the low level at time t7. P-type transistor Mvp0 receiving signal CLp at its gate supplies supply voltage Vdd to power supply voltage output node Np. It is noted that the circuit delays caused by inverter IV5 and NAND circuit ND1 in delay control circuit DLsp are shorter than that caused by delay circuit DLY2 or the like. Therefore, signal/CTLvp, signal CLp and authentication control signal CTLv shall be changed at substantially the same timing.

As shown in FIG. 14 at (b) and (d), when authentication control signal CTLv is changed from the high level to the low level at time t6, signal CLn is changed from the low level to the high level at time t8 at which delay time Tdly1 elapses from time t6. This delay time Tdly1 indicates a delay time produced when authentication control signal CTLv passes through delay circuit DLY1, inverter IV6, and NOR circuits NR2 and NR1 shown in FIG. 13. It is noted that, since the circuit delays caused by inverter IV6 and NOR circuits NR2 and NR1 are shorter than the delay time caused by delay circuit DLY1, delay time Tdly1 is mostly determined by the delay caused by delay circuit DLY 1.

As shown in FIG. 14 at (d) and (g), when signal CLn is changed from the low level to the high level at time t8, n-type transistor Mvn0 receiving signal CLn at its gate is brought into the conducting state, and supplies supply voltage Vss to power supply voltage output node Nn. The mechanism in which data appearing at storage nodes N00 and N01 in memory cell MC is determined after time t7 in the period (Tpbn) in which P/N advance control signal CTLpn is at the low level overlaps FIGS. 8, 9 and their relevant description, and description thereof will not be repeated here.

As described above, in the present embodiment, by setting P/N advance control signal CTLpn at the low level, the time point at which cell power line Vddp starts rising from intermediate voltage Vdd/2 to supply voltage Vdd can precede the time point at which cell power line Vssn starts dropping from intermediate voltage Vdd/2 to supply voltage Vss.

Through use of this system, data in memory cell MC can be determined based on the magnitude correlation between the threshold voltages of p-type transistors M00 and M01 constituting inverters In0 and In1 in memory cell MC. Moreover, as described above, since the factor that determines the data in memory cell MC is limited to the difference between the threshold voltages of the two p-type transistors, reproducibility of data appearing in a memory cell when the identification number of a semiconductor device is re-generated by the present system is high.

Next, a system for controlling power supply control circuit 140_2 by authentication control signal CTLv in period Tnbp in which P/N advance control signal CTLpn is maintained at the high level will be described.

As shown in FIG. 14 at (a) and (d), P/N advance control signal CTLpn is set at the high level in period Tnbp from time t11 to time t19. Output signal Cd1 of NOR circuit NR2 is maintained at the low level, without depending on the logic level of the other input signal b. Therefore, signal CLn input to the gate of n-type transistor Mvn0 has a logic level obtained by inverting authentication control signal CTLv in NOR circuit NR1.

As shown in FIG. 14 at (b) and (e), the change of authentication control signal CTLv at time t12 from the low level to the high level changes signal CLp from the low level to the high level at time t13 after subjected to the circuit delays caused by inverter IV5 and NAND circuit ND1. Signal CLp is input to the gate of p-type transistor Mvp0, and supply of supply voltage Vdd to power supply voltage output node Np is interrupted.

When authentication control signal CTLv is changed from the low level to the high level at time t12, output signal CLn of delay control circuit DLsn is changed from the high level to the low level (see FIG. 14 (d)). Signal CLn is input to the gate of n-type transistor Mvn0, and supply of supply voltage Vss to power supply voltage output node Nn is interrupted.

Furthermore, when authentication control signal CTLv is changed from the low level to the high level at time t12, output signal S obtained from inverters IV0, IV1, IV2 and pulse generation circuit OSP is maintained at the low level in the period of delay time Tdly from time t14 to time t15 (see FIG. 14 (f)).

Signal S is changed from the high level to the low level at time t14, and as shown in FIG. 14 at (g), the electric potentials at cell power lines Vssn and Vddp transition from supply voltages Vss and Vdd to intermediate voltage Vdd/2, respectively.

As shown in FIG. 14 at (b) and (g), when authentication control signal CTLv is changed from the high level to the low level at time t16, and output signal CLn is changed from the low level to the high level at time t17 through NOR circuit NR1. Therefore, n-type transistor Mvn0 receiving output signal CLn at its gate supplies supply voltage Vss to power supply voltage output node Nn. It is noted that, since the circuit delay caused by NOR circuit NR1 in delay control circuit DLsn is shorter than that caused by delay circuit DLY1 or the like, signal CLn is shown to be changed substantially at the same timing as authentication control signal CTLv.

When authentication control signal CTLv is changed from the high level to the low level at time t16, signal CLp is changed from the high level to the low level at time t18 at which delay time Tdly2 elapses from time t16 (see FIG. 14 (e)). This delay time Tdly2 is a total sum of circuit delays caused by delay circuit DLY2, NAND circuit ND2 and NAND circuit ND1. It is noted that, since the circuit delay caused by delay circuit DLY2 is longer than those caused by NAND circuits ND2 and ND1, delay time Tdly2 shall be equal to the circuit delay caused by delay circuit DLY2.

As shown in FIG. 14 at (e), when signal CLp is changed from the high level to the low level at time t18, p-type transistor Mvp0 receiving signal CLp at its gate is brought into the conducting state, and supplies supply voltage Vdd to power supply voltage output node Np. The mechanism in which data appearing at storage nodes N00 and N01 in memory cell MC is determined after time t17 in the period (Tnbn) in which P/N advance control signal CTLpn is at the high level overlaps FIGS. 8, 9 and their relevant description, and description thereof will not be repeated here.

As described above, in the present embodiment, by setting P/N advance control signal CTLpn at the high level, the time point at which cell power line Vssn starts dropping from intermediate voltage Vdd/2 to supply voltage Vss can precede the time point at which cell power line Vddp starts rising from intermediate voltage Vdd/2 to supply voltage Vdd.

With this system, data in memory cell MC can be determined based on the magnitude correlation between the threshold voltages of n-type transistors M02 and M03 constituting inverters In0 and In1 in memory cell MC. Moreover, in the present embodiment, since appearing data is determined by the aforementioned factor, reproducibility of data appearing in a memory cell when the identification number of a semiconductor device is re-generated by the present system is high.

Figure 15:
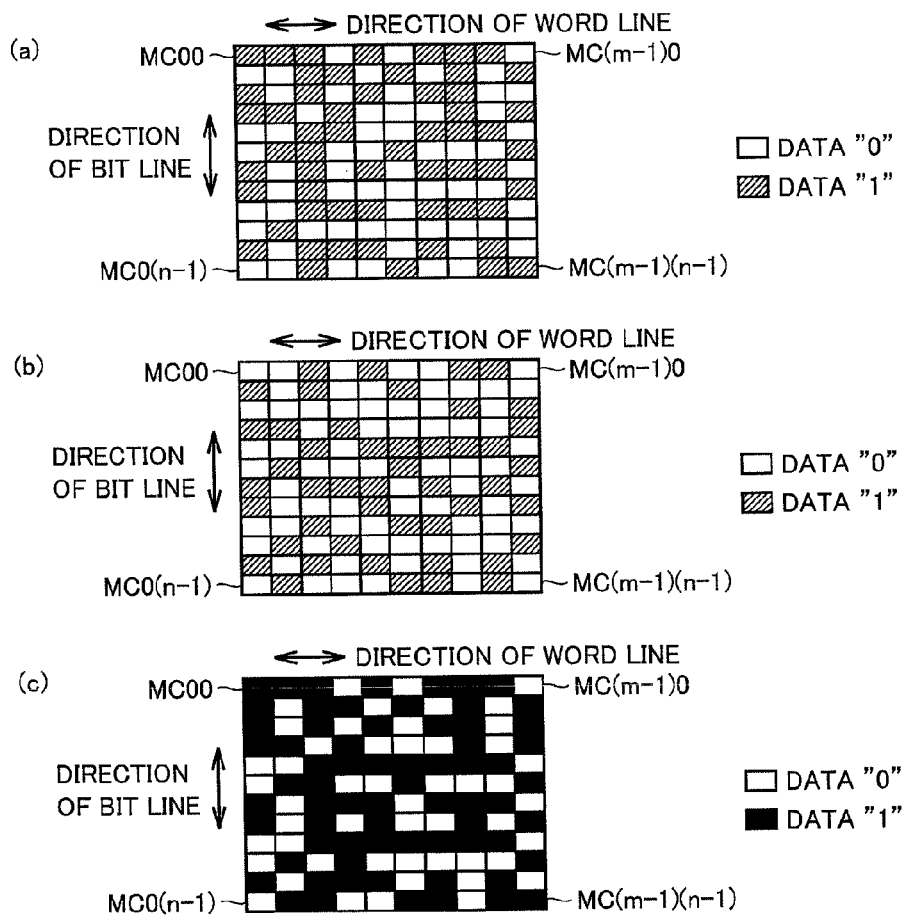
FIG. 15 illustrates a data pattern of chip-specific identification information generated by the identification information generation circuit according to the second embodiment.

Referring to FIG. 15, a data pattern of chip-specific identification information Chip_id generated by identification information generation circuit 100_2 according to the second embodiment of the present invention will be described.

FIG. 15 schematically shows at (a), (b) and (c) memory arrays each having m-bit memory cells along the word line and n-bit memory cells along the bit line. FIG. 15 shows at (a) an example data pattern in which the timing of supplying supply voltage Vdd to cell power line Vddp precedes the timing of supplying supply voltage Vss to cell power line Vssn. This data pattern is determined based on the magnitude correlation between the threshold voltages of two p-type transistors in memory cell MC.

The address of the left upper memory cell MC is (0, 0), and the address of the right upper memory cell MC is (m−1, 0). The address of the left lower memory cell MC is (0, n−1), and the address of the right lower memory cell MC is (m−1, n−1). Here, X address and Y address are indicated in the parenthesis.

A memory array subjected to detection of the data pattern shown in FIG. 15 at (a) may be all the memory cells MC included in memory array 151 of FIG. 12 or some memory cells MC included in memory array 151.

In FIG. 15 at (a), hatched cells are intended to indicate that data "1" is held therein, and blank cells are intended to indicate that data "0" is held therein. Data "0" and data "1" represent the electric potentials complementarily held at storage nodes N00 and N01 (supply voltage Vss or supply voltage Vdd). Data "0" corresponds to the case where storage node N00 is at supply voltage Vss, and data "1" corresponds to the case where storage node N00 is at supply voltage Vdd.

FIG. 15 shows at (b) an example data pattern in which the timing of supplying supply voltage Vss to cell power line Vssn precedes the timing of supplying supply voltage Vdd to cell power line Vddp. This data pattern is determined based on the magnitude correlation between the threshold voltages of two n-type transistors in memory cell MC.

The data patterns shown in FIG. 15 at (a) and (b) are obtained in time series. When the data shown in FIG. 15 at (a) is obtained, data output circuit 152 outputs output data Dout to BIST control circuit 102. In response to request signal RQ output from authentication control circuit 101_2, BIST control circuit 102 returns the data pattern to authentication control circuit 101_2 as memory data MD. Authentication control circuit 101_2 outputs the data pattern as chip-specific identification information Chip_id (see FIG. 12). Next, when the data shown in FIG. 15 at (b) is obtained, data output circuit 152 outputs the data pattern as chip-specific identification information Chip_id similarly to the above.

A service provider having received the respective data patterns shown in FIG. 15 at (a) and (b) as chip-specific identification information Chip_id generates new chip-specific identification information based on these two data patterns.

FIG. 15 shows at (c) an example of new chip-specific identification information generated by the service provider based on the respective data patterns shown in FIG. 15 at (a) and (b). The data pattern shown in FIG. 15 at (c) is the result of performing an OR operation on each piece of data held at an identical memory cell address in FIG. 15 at (a) and (b). Not only an OR operation but also an AND operation or another logical operation may be applied to operation of each piece of data.

Identification information generation circuit 100_2 according to the second embodiment of the present invention generates two data patterns from memory array 151. Therefore, it is still more difficult for an attacker to read chip-specific identification information. Furthermore, since chip-specific identification information is generated by performing a logical operation between these two data patterns, an attacker cannot derive the chip-specific identification information unless he/she obtains this logical operation. Therefore, the chip-specific identification information generated through use of the present system is improved in resistance to tampering (reliability).

[Third Embodiment]

Figure 16:
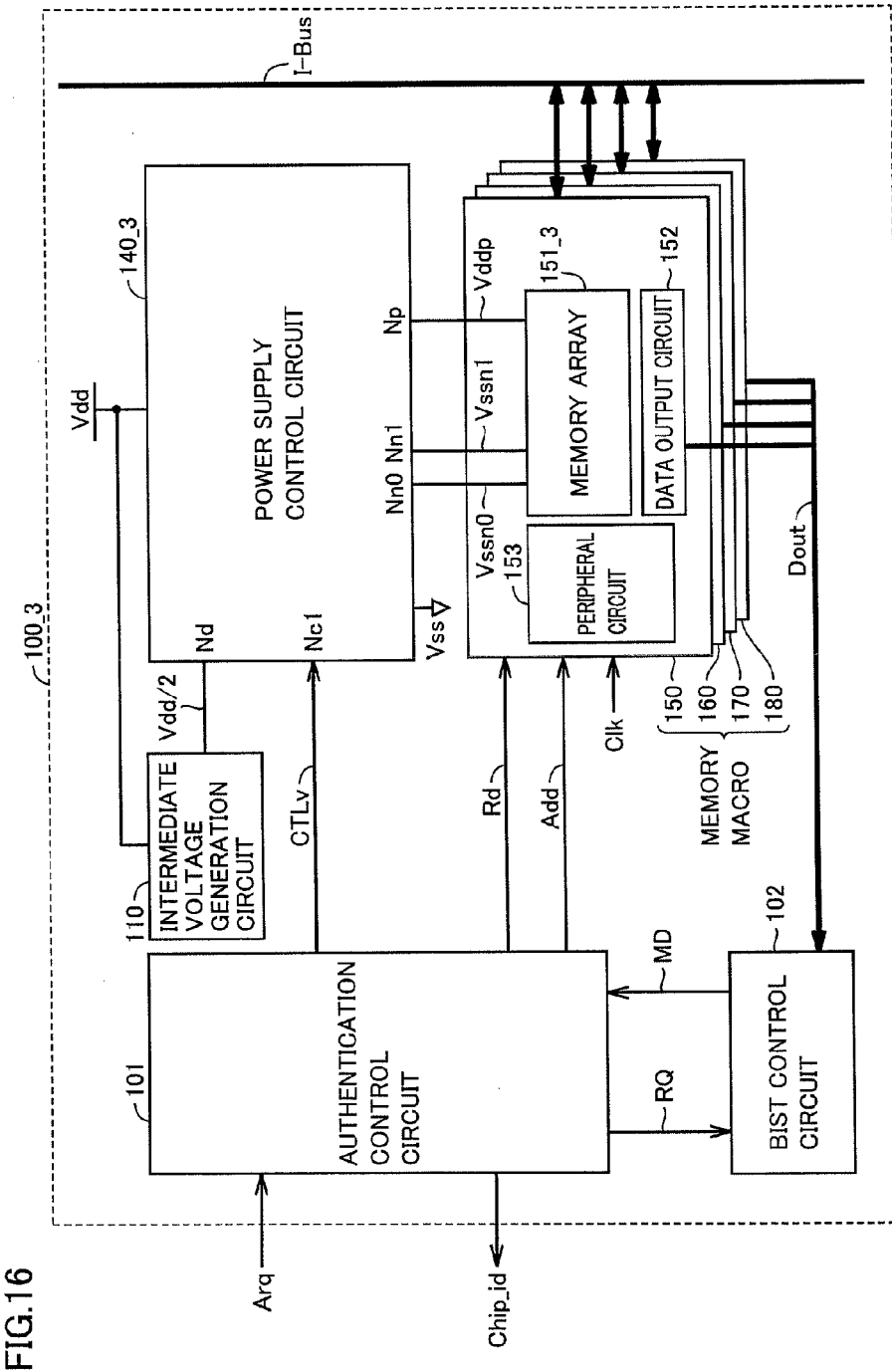
FIG. 16 is a circuit diagram of an identification information generation circuit included in a semiconductor device according to a third embodiment.

Referring to FIG. 16, a configuration of an identification information generation circuit 100_3 included in a semiconductor device according to a third embodiment of the present invention will be described.

Identification information generation circuit 100_3 differs from identification information generation circuit 100_1 of the semiconductor device according to the first embodiment of the present invention shown in FIG. 1 in the configuration of a power supply control circuit 140_3 and a memory array 151_3.

Figure 17:
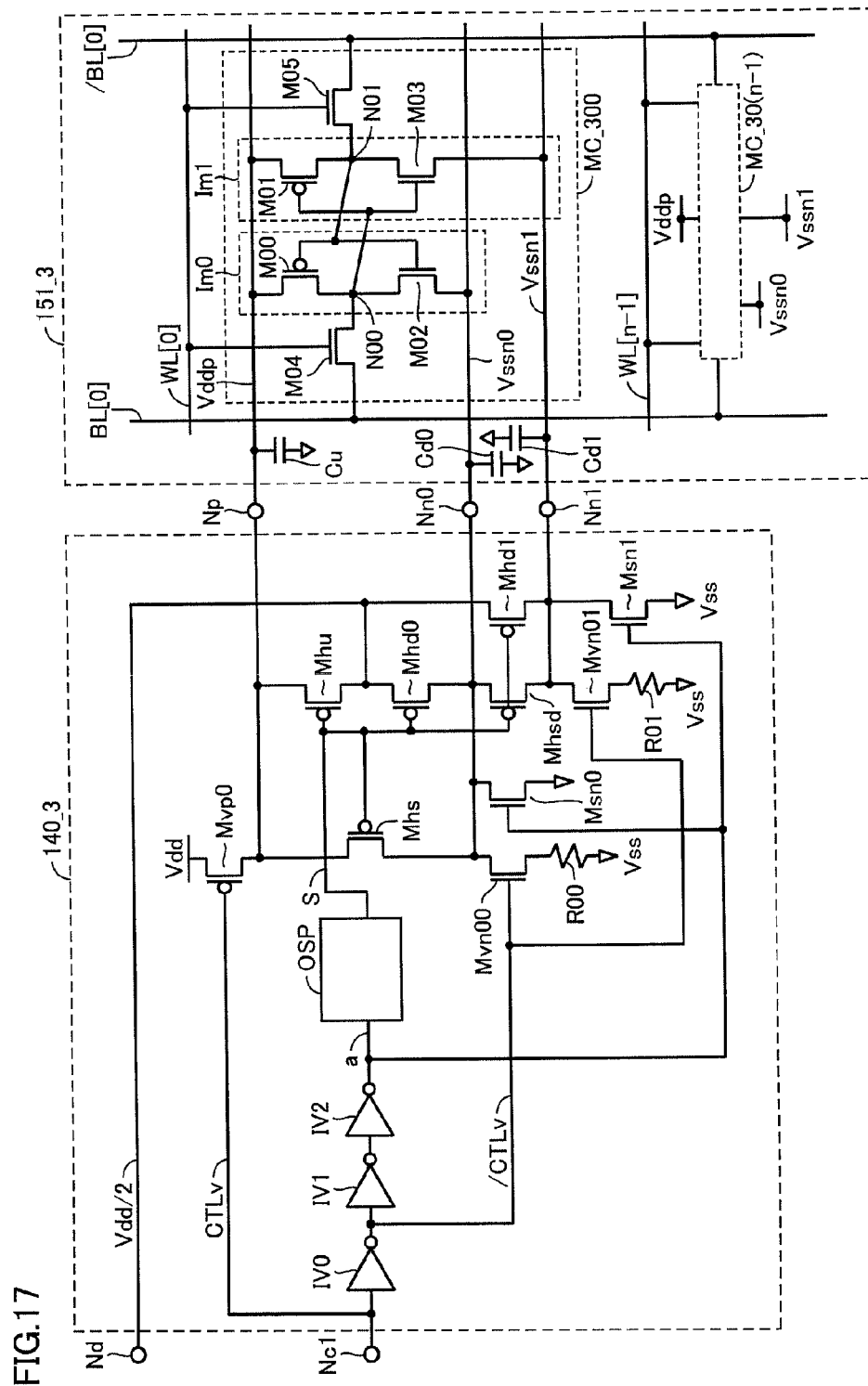
FIG. 17 is a detailed circuit diagram of a power supply control circuit and a memory array according to the third embodiment.

Referring to FIG. 17, a circuit block configuration of power supply control circuit 140_3 and memory array 151_3 according to the third embodiment of the present invention will be described.

Power supply control circuit 140_3 has input node Nc1, intermediate voltage input node Nd, and power supply voltage output nodes Nn0, Nn1 and Np. Authentication control signal CTLv is applied to input node Nc1, and intermediate voltage Vdd/2 is applied to intermediate voltage input node Nd.

In power supply control circuit 140_3, n-type transistor Msn0 has its drain connected to power supply voltage output node Nn0, and supply voltage Vss is applied to the source. An n-type transistor Myn00 has its drain connected to power supply voltage output node Nn0, and its source connected to one end of a resistor R00. Supply voltage Vss is applied to the other end of resistor R00.

An n-type transistor Msn1 has its drain connected to power supply voltage output node Nn1, and supply voltage Vss is applied to the source. An n-type transistor Mvn01 has its drain connected to power supply voltage output node Nn1, and its source connected to one end of a resistor R01. Supply voltage Vss is applied to the other end of resistor R01.

P-type transistor Mvp0 has its drain connected to power supply voltage output node Np, and supply voltage Vdd is applied to the source. P-type transistor Mhs is interposed between power supply voltage output nodes Np and Nn0, and has its source and drain connected to power supply voltage output node Np and Nn0, respectively. A p-type transistor Mhsd is interposed between power supply voltage output nodes Nn0 and Nn1, and has its source and drain connected to power supply voltage output node Nn0 and Nn1, respectively.

P-type transistors Mhu and Mhd0 having a common drain are interposed between power supply voltage output nodes Nn0 and Np, and have their sources connected to power supply voltage output nodes Np and Nn0, respectively. The common drain of p-type transistors Mhu and Mhd0 is connected to intermediate voltage input node Nd. P-type transistor Mhd1 has its source connected to intermediate voltage input node Nd, and its drain connected to power supply voltage output node Nn1.

Signal S is applied to the gate of each of p-type transistors Mhs, Mhu, Mhd0, Mhd1, and Mhsd. The same circuit configuration as pulse generation circuit OSP shown in FIG. 5 is used for pulse generation circuit OSP that generates signal S.

Authentication control signal CTLv applied to input node Nc1 is applied to the gate of p-type transistor Mvp0 and inverter IV0. Inverter IV0 inverts the logic of authentication control signal CTLv to output control signal /CTLv. Control signal /CTLv is applied to the gate of each of n-type transistors Myn00 and Mvn01.

Authentication control signal CTLv passes through inverters IV0, IV1, and IV2 to generate signal a. Signal a is applied to the input of pulse generation circuit OSP and the gate of each of n-type transistors Msn0 and Msn1.

Unlike the first embodiment shown in FIG. 5, supply voltage Vss is supplied to memory array 151_3 through two power supply voltage output nodes Nn0 and Nn1 included in power supply control circuit 140_3. This memory cell is indicated as MC_3, and the bit number corresponding to a bit line pair is set at 1 bit. To indicate the address of a memory cell, the following notation system is adopted. A memory cell MC 300 is expressed as (word address: 0, bit address: 0), and a memory cell MC_30(n–1) is expressed as (word address: 0, bit address: (n–1)). A total of n memory cells MC_3 are arrayed.

It is noted that, although memory array 151_3 is configured such that a bit line pair corresponds to 1 bit in the third present embodiment, the object and effects of the present patent application will not be affected even with a configuration for more than 1 bit or even if the memory array has a configuration different from that of the present embodiment.

Memory cell MC_3 has inverters Im0 and Im1. The sources of n-type transistors M02 and M03 of inverters Im0 and Im1 are separated, and supply voltage Vss is supplied to each inverter.

In FIG. 17, n-type transistor M02 included in inverter Im0 and n-type and transistor M03 included in inverter Im1 have their sources connected to cell power lines Vssn0 and Vssn1, respectively. Cell power lines Vssn0 and Vssn1 are connected to power supply voltage output nodes Nn0 and Nn1, respectively. P-type transistor M00 included in inverter Im0 and p-type transistor M01 included in inverter Im1 have their sources connected in common to cell power line Vddp. Cell power line Vddp is connected to power supply voltage output node Np.

As shown in FIG. 17, cell power lines Vssn0, Vssn1 and Vddp have parasitic capacitances Cd0, Cd1 and Cu, respectively.

Figure 18:
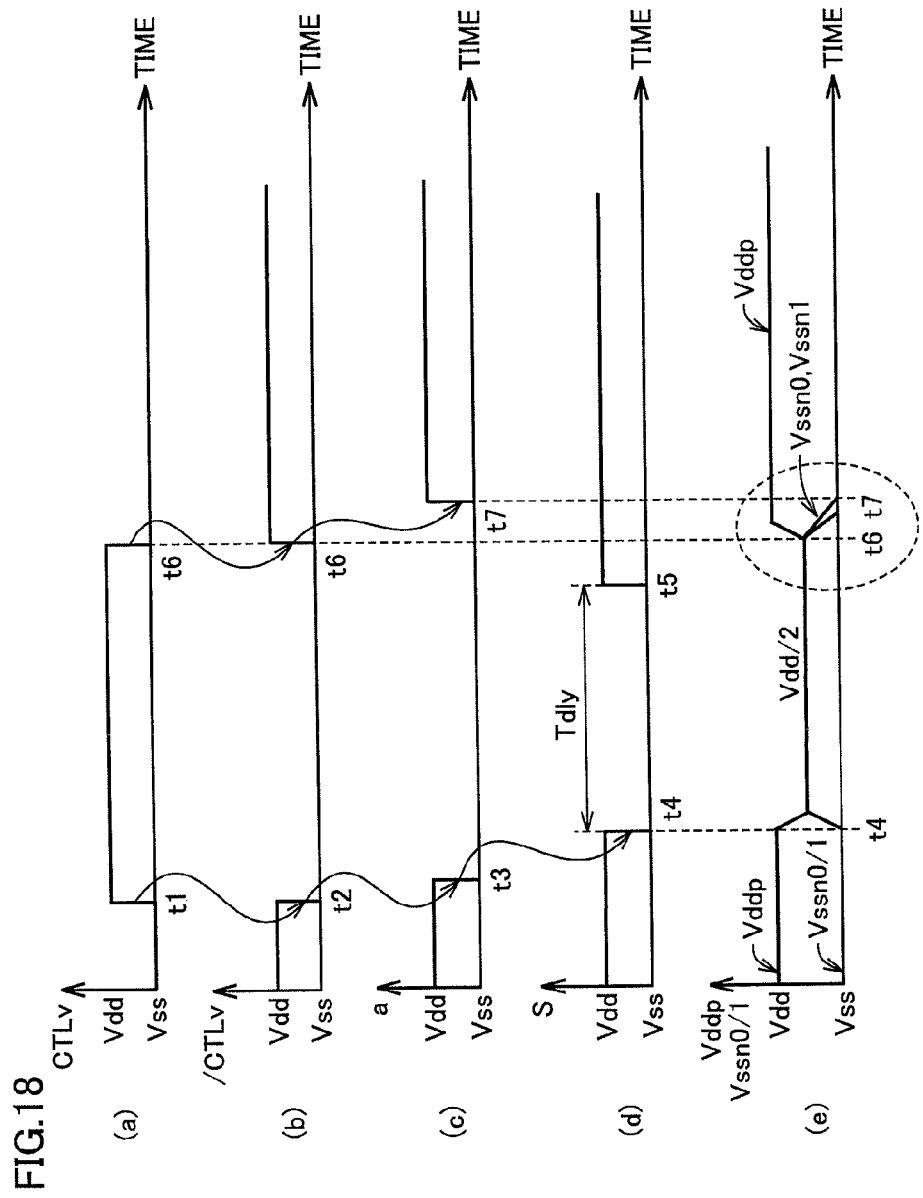
FIG. 18 is an operation timing chart of the power supply control circuit according to the third embodiment.

Referring to FIG. 18, the operation of power supply control circuit 140_3 will be described.

As shown in FIG. 18 at (a) and (b), when authentication control signal CTLv is changed from the low level to the high level at time t1, signal /CTLv is changed from the high level to the low level at time t2.

As shown in FIG. 18 at (b), (c) and (d), the logic level of signal /CTLv changes at time t2, and output signal a is changed from the high level to the low level at time t3 through inverters IV1 and IV2. Output signal S of pulse generation circuit OSP receiving signal a is maintained at the low level in the period of delay time Tdly from time t4 to time t5.

As shown in FIG. 18 at (a) and (c), in the period until time t3, signal a is maintained at the high level in accordance with the low level of authentication control signal CTLv. In this period, n-type transistors Msn0 and Msn1 shown in FIG. 17 are in the conducting state. Therefore, the electric potentials at cell power lines Vssn0 and Vssn1 are maintained at supply voltage Vss.

As shown in FIG. 18 at (b) to (e), after time t3, signal /CTLv and signal a are maintained at the low level, and n-type transistors Myn00, Mvn01, Msn0, and Msn1 are in the non-conducting state. When signal S is changed from the high level to the low level at time t4, p-type transistors Mhs and Mhsd are brought into the conducting state to short-circuit each of power supply voltage output nodes Np, Nn0 and Nn1.

P-type transistors Mhu, Mhd0 and Mhd1 are also brought into the conducting state, and intermediate voltage Vdd/2 is supplied to all of power supply voltage output nodes Nn0, Nn1 and Np.

As shown in FIG. 18 at (a) and (b), when authentication control signal CTLv is changed from the high level to the low level at time t6, signal /CTLv is changed from the low level to the high level after subjected to the circuit delay caused by inverter IV0. Since the circuit delay caused by inverter IV0 is shorter than the delay time caused by delay circuit DLY or the like, the timing at which this signal /CTLv is changed is shown to be substantially the same as time t6.

As shown in FIG. 18 at (e), when signal /CTLv is changed from the low level to the high level at time t6, n-type transistors Mvn00 and Mvn01 shown in FIG. 17 are brought into the conducting state. The electric potential at power supply voltage output node Nn0 drops from intermediate voltage Vdd/2 to supply voltage Vss through n-type transistor Mvn00 and resistor R00. The electric potential at power supply voltage output node Nn1 also drops from intermediate voltage Vdd/2 to supply voltage Vss through n-type transistor Mvn01 and resistor R01.

The present embodiment is intended to adjust appearance ratio of data "0" or "1" in memory cell MC_3. For example, for the threshold voltages of n-type transistors M02 and M03 in the memory cell, if an imbalanced tendency of variation in threshold voltage Vth02<variation in threshold voltage Vth03 is fixed due to a mask displacement in the manufacturing process or the like, randomness of data appearance will be impaired.

Then, this randomness is restored by setting resistors R00 and R01 to have different resistance values. The paths from the nodes of the sources of n-type transistors M02 and M03 included in inverters Im0 and Im1 in memory cell MC_3 to supply voltage Vss have different impedance values. Supply voltage Vss is applied to cell power line Vssn0 through n-type transistor Mvn00 and resistor R0D, and supply voltage Vss is applied to cell power line Vssn1 through n-type transistor Mvn01 and resistor R01.

As shown in FIG. 18 at (b), when signal /CTLv is changed from the low level to the high level at time t6, electric charge in each line set at intermediate voltage Vdd/2 is discharged, so that the electric potentials at cell power lines Vssn0 and Vssn1 drop to supply voltage Vss. The discharge speed of each line is expressed by the time constants of resistance and capacitance of the path. Therefore, the difference between discharge speeds of electric charges charged at the sources of n-type transistors M02 and M03 is the difference between the resistance values of resistors R0O and R01, assuming that the parasitic resistance and parasitic capacitance of cell power lines Vssn0 and Vssn1 are in the same conditions.

Figure 19:
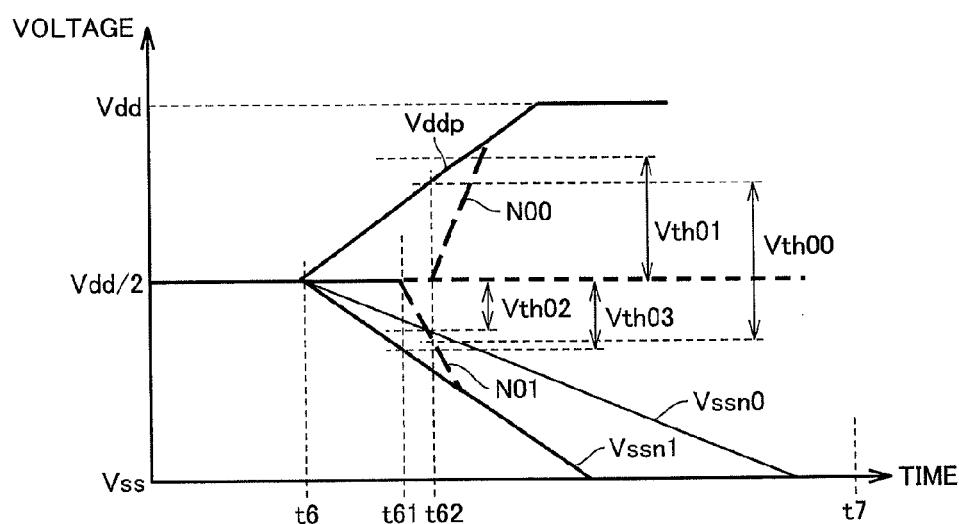
FIG. 19 is an operation timing chart of a memory cell according to the third embodiment.

As to the n-type transistors of the first and second embodiments, data appearing in a memory cell is determined by the contribution of the magnitude correlation between the threshold voltages of n-type transistors M02 and M03. However, in consideration of the aforementioned discharge speeds, randomness of data appearing in a memory cell can be maintained by a design under the condition that the resistance value of resistor R00>the resistance value of resistor R01 even if there is an imbalanced tendency of variation in threshold voltage Vth02<variation in threshold voltage Vth03. In FIG. 18 at (e), the portion enclosed with a dashed ellipse shows the state of the electric potentials at cell power lines Vssn0 and Vssn1 after time t6. FIG. 19 shows that portion on an enlarged scale.

Referring to FIG. 19, the operation of memory cell MC_3 after time t6 will be described.

For ease of description of the present embodiment, it is assumed that the resistance value of resistor R00 shown in FIG. 17 is higher than that of resistor R01, and that threshold voltage Vth01 of p-type transistor M01 in memory cell MC_3 is lower than threshold voltage Vth00 of p-type transistor M00. It is also assumed that threshold voltage Vth02 of n-type transistor M02 is lower than threshold voltage Vth03 of n-type transistor M03. Furthermore, the threshold voltage of a p-type transistor shall be higher than that of an n-type transistor. On these assumptions, the threshold voltage of n-type transistor M02 is the lowest on the premise that data appearing in a memory cell is determined by the magnitude correlation between threshold voltages. Therefore, the electric potential at supply voltage Vss will necessarily appear at storage node N00.

As shown in FIG. 18 at (e), at time t6, the electric potentials at the source, drain and gate of each of the four transistors constituting inverters Im0 and Im1 are maintained at intermediate voltage Vdd/2. When authentication control signal CTLv is changed from the high level to the low level at time t6, cell power line Vddp starts rising from intermediate voltage Vdd/2 toward supply voltage Vdd, and the electric potentials at cell power lines Vssn0 and Vssn1 start dropping from intermediate voltage Vdd/2 toward supply voltage Vss.

Cell power line Vssn0 is connected to n-type transistor Mvn00 through resistor R00, and cell power line Vssn1 is connected to power line Vss through n-type transistor Mvn01 and resistor R01. In the present embodiment, it is assumed that resistor R00 has a resistance greater than that of resistor R01. For this reason, the electric potential at cell power line Vssn0 has a dropping transition speed slower than that of the electric potential at cell power line Vssn1. Similarly to the first and second embodiments, the electric potential at cell power line Vddp rises quickly to supply voltage Vdd by p-type transistor Mvp0 being brought into the conducting state.

In FIG. 19, at time t61, the electric potentials at storage nodes N00 and N01 are maintained at intermediate voltage Vdd/2, and the electric potential at cell power line Vssn1 is lower than that of cell power line Vssn0. This is because the electric potential at cell power line Vssn0 has a dropping transition speed slower than that of the electric potential at cell power line Vssn1.

At this time, it is of concern which one of n-type transistors M02 and M03 has been brought into the conducting state earlier at time t61. In the description of the present third embodiment, it is assumed that, at time t61, the electric potential difference between intermediate voltage Vdd/2 (electric potential at storage nodes N00 and N01) and cell power line Vssn1 reaches Vth03, and the electric potential difference between intermediate voltage Vdd/2 and cell power line Vssn0 has not reached Vth02. Accordingly, n-type transistor M03 is brought into the conducting state, and the electric potential at storage node N01 drops to the electric potential at cell power line Vssn1.

As to the p-type transistors, the threshold voltage of p-type transistor M00 is higher than that of p-type transistor M01, but the electric potential at storage node N01 is lower than intermediate voltage Vdd/2 at time t62. Therefore, the electric potential difference between the gate and source of p-type transistor M00 reaches threshold voltage Vth00, and p-type transistor M00 is brought into the conducting state. On the other hand, the electric potential at storage node N00 is intermediate voltage Vdd/2, and the electric potential difference from cell power line Vddp has not reached threshold voltage Vth01 of p-type transistor M01. Therefore, p-type transistor M01 is in the non-conducting state.

After time t62, the electric potential at storage node N01 becomes equal to that of cell power line Vssn1, and the electric potential at storage node N00 becomes equal to that of cell power line Vddp. Therefore, n-type transistors M02 and M01 are maintained in the non-conducting state, the electric potentials at cell power lines Vssn0 and Vssn1 transition to supply voltage Vss, and the electric potential at cell power line Vddp transitions to supply voltage Vdd.

Returning to time t61, the case where n-type transistor M02 is brought into the conducting state earlier is now considered. After time t61, the electric potential at storage node N01 is maintained at intermediate voltage Vdd/2, and the electric potential at storage node N00 becomes equal to and transitions with that of cell power line Vssn0. In the process in which the electric potential at cell power line Vddp rises after time t61, it is clear that p-type transistor M01 is brought into the conducting state earlier than p-type transistor M00, and the electric potential at storage node N01 becomes equal to and transitions with that of cell power line Vddp.

As described above, if there is an imbalanced tendency in magnitude correlation between threshold voltages of paired MOS transistors, randomness of data appearing in a memory cell can be improved by adjusting the resistance values in accordance with the present system. The threshold voltage of a p-type transistor shall be higher than that of an n-type transistor in the present embodiment. If the threshold voltage of a p-type transistor is lower than that of an n-type transistor, appearing data is determined by variations in threshold voltage of the p-type transistor. Randomness is thus ensured. If there is an imbalanced tendency in threshold voltage of the p-type transistor, randomness can be adjusted by adopting the power supply control circuit of the second modification of the first embodiment shown in FIG. 10 to separate power line Vddp for each inverter and insert a resistor between the source of a p-type transistor and supply voltage Vdd similarly to the present embodiment.

After time t7, data output circuit 152 shown in FIG. 16 outputs data appearing at storage nodes N00 and N01 shown in FIG. 19, held by each of memory cells MC_300 to MC_30(n−1), to BIST control circuit 102 as output data Dout. In response to request signal RQ output from authentication control circuit 101, BIST control circuit 102 returns data in each memory cell MC to authentication control circuit 101 as memory data MID. Authentication control circuit 101 outputs this memory data MD as chip-specific identification information Chip_id.

In the present embodiment, a resistor is connected to the source of each of n-type transistors Mvn00 and Mvn01. As another embodiment that achieves effects similar to those of the present embodiment, a system in which a capacitance is connected to each of power supply voltage output nodes Nn0 and Nn1 and the power lines are varied in time constant may be adopted. Moreover, in the configuration of this system, the above-mentioned resistance values may be zero or may have an equal value.

[Fourth Embodiment]

Figure 20:
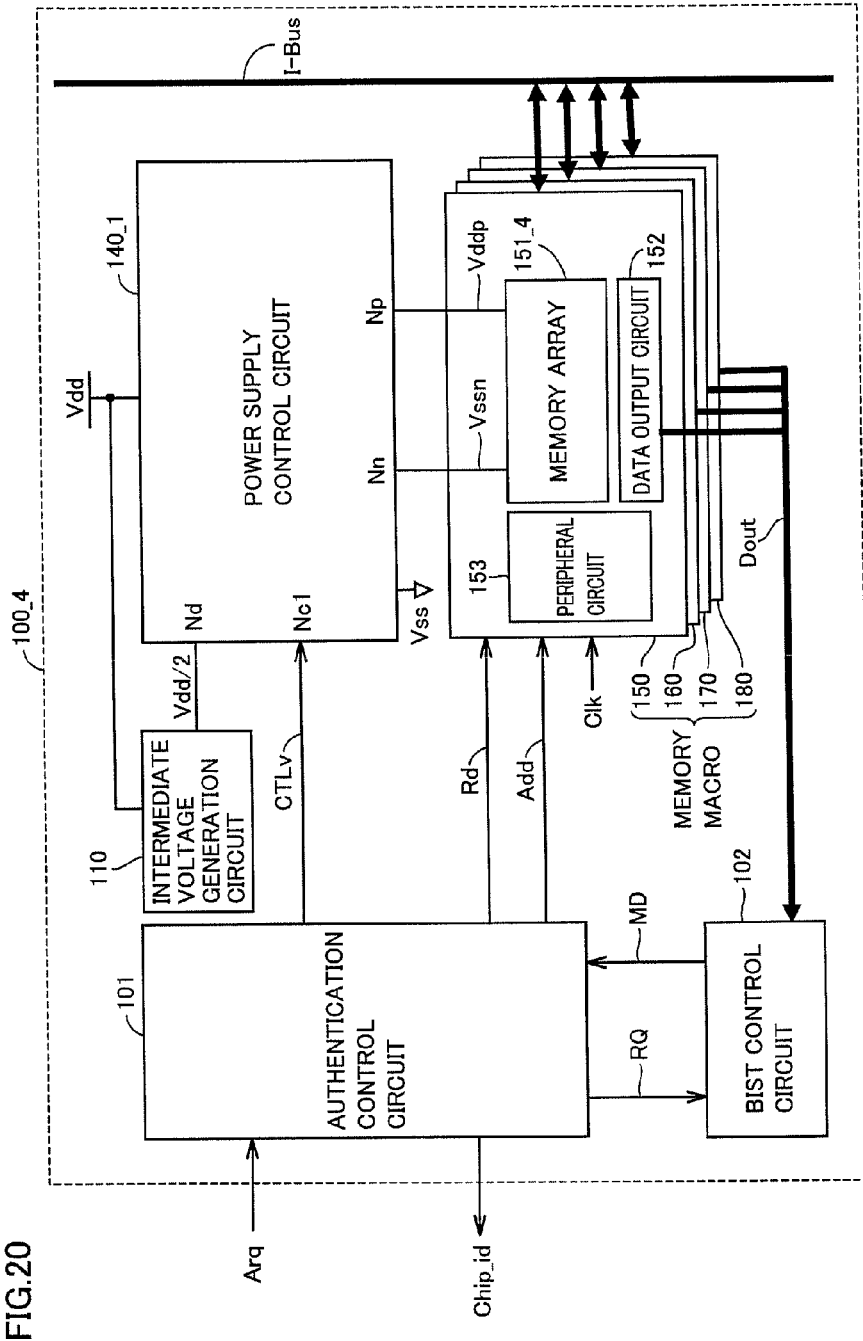
FIG. 20 is a circuit diagram of an identification information generation circuit included in a semiconductor device according to a fourth embodiment.

Referring to FIG. 20, a configuration of an identification information generation circuit 100_4 included in a semiconductor device according to a fourth embodiment of the present invention will be described.

Identification information generation circuit 100_4 differs from identification information generation circuit 100_1 of the semiconductor device according to the first embodiment of the present invention shown in FIG. 1 in the configuration of a memory array 151_4.

Figure 21:
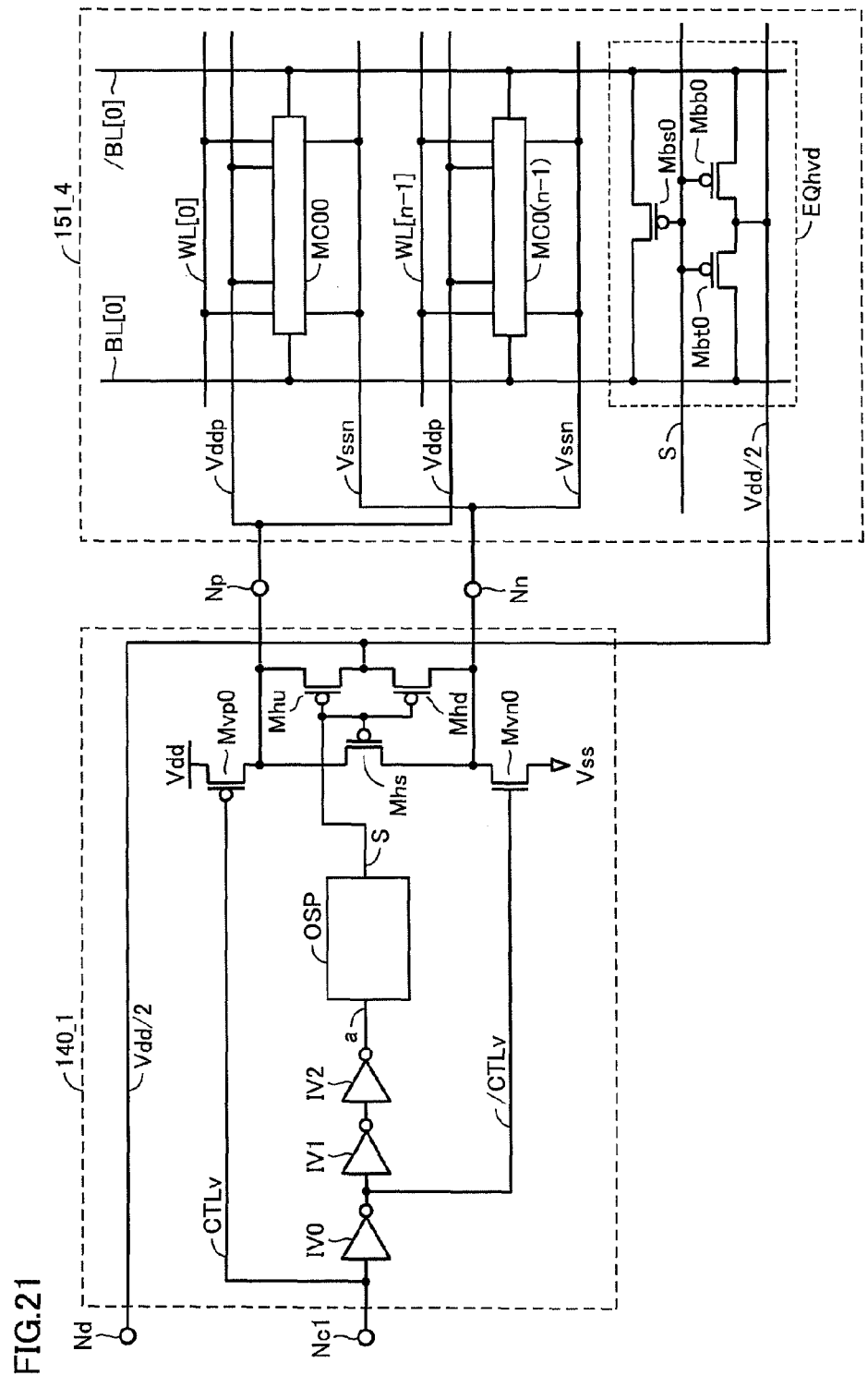
FIG. 21 is a circuit diagram of a memory array according to the fourth embodiment.

Referring to FIG. 21, a circuit block configuration of memory array 151_4 according to the fourth embodiment of the present invention will be described.

Memory array 151_4 has n memory cells MC arranged along bit lines BL and /BL and m memory cells MC arranged along word line WL. The number of memory cells MC in memory array 151_4 is expressed as n X m. It should be noted that the value of m is 1 in memory array 151_4 shown in FIG. 21. Memory cell MC has the same circuit configuration as that of FIG. 4, and description of the circuit configuration and the function of each MOS transistor will not be repeated. Cell power line Vssn of each memory cell (MC00 to MC0(n−1)) is connected to power supply voltage output node Nn, and cell power line Vddp is similarly connected to power supply voltage output node Np.

Memory array 151_4 further has a bit line intermediate voltage supply circuit EQhvd connected to each bit line pair (BL, /BL).

Bit line intermediate voltage supply circuit EQhvd includes p-type transistors Mbt0, Mbb0 and Mbs0. P-type transistors Mbt0 and Mbb0 have a common source, and intermediate voltage input node Nd through which intermediate voltage Vdd/2 is supplied is connected to the node of the common source. P-type transistor Mbt0 has its drain connected to bit line BL[0], and p-type transistor Mbb0 has its drain connected to a bit line /BL[0]. P-type transistor Mbs0 has its source and drain connected to bit lines BL and /BL, respectively. Signal S generated by power supply control circuit 140_1 is applied to the gates of p-type transistors Mbt0, Mbb0 and Mbs0.

Referring to FIG. 22, the operation of power supply control circuit 140_1 and memory array 151_4 will be described.

As shown in FIG. 22 at (a) and (c), authentication control signal CTLv is changed from the low level to the high level at time t1, and signal S is maintained at the low level in the period of delay time Tdly from time t3 to time t4. Therefore, as shown in FIG. 22 at (d), after time t3, the electric potentials at cell power lines Vssn and Vddp transition from supply voltages Vss and Vdd to intermediate voltage Vdd/2, respectively.

A precharge circuit (not shown) having the same circuit configuration as bit line intermediate voltage supply circuit EQhvd and supplying supply voltage Vdd is connected to bit lines BL[0] and /BL[0] shown in FIG. 21. As shown in FIG. 22 at (e), in the preparatory step before starting access to a memory cell (read operation or write operation), the above-mentioned precharge circuit precharges one pair of bit lines BL[0] and /BL[0] to supply voltage Vdd. Then, at time t3 when signal S is changed from the high level to the low level, the electric potential at one pair of bit lines BL and /BL starts transitioning toward intermediate voltage Vdd/2. This is because three p-type transistors Mbt0, Mbb0 and Mbs0 in bit line intermediate voltage supply circuit EQhvd shown in FIG. 21 short-circuit one pair of bit lines BL and /BL with the low level of signal S functioning as a trigger signal and supply intermediate voltage Vdd/2 to each bit line.

As shown in FIG. 22 at (f), in a period Tw from time tw0s to time tw0e, a pulse signal for raising the electric potential to supply voltage Vdd is applied to word line WL[0]. As a result, intermediate voltage Vdd/2 output from bit line intermediate voltage supply circuit EQhvd is applied to storage nodes N00 and N01 through access MOS transistors (n-type transistors M04 and M05) of memory cell MC shown in FIG. 4.

In the power supply control circuits according to the first to third embodiments, the electric potentials at storage nodes N00 and N01 are set at Vdd/2 by setting cell power lines Vssn and Vddp to have intermediate voltage Vdd/2 while maintaining the access MOS transistors (M04 and M05) in the non-conducting state. With this system in which the access MOS transistors (M04 and M05) are maintained in the non-conducting state, the electric potential at storage node N00 or N01 may be lower than intermediate voltage Vdd/2 by the threshold voltage of any of the four MOS transistors except the access MOS transistors in a memory cell or higher than intermediate voltage Vdd/2 by the threshold voltage.

This is because either a p-type transistor or an n-type transistor is brought into the non-conducting state before the electric potentials at the storage nodes reach intermediate voltage Vdd/2. However, this electric potential shifted from intermediate voltage Vdd/2 by the threshold voltage is a temporary electric potential, and the electric potentials at storage nodes N00 and N01 eventually reach intermediate voltage Vdd/2 because of current leakage (subthreshold leakage and gate leakage) brought about in MOS transistors. According to the present fourth embodiment, however, the electric potentials at the storage nodes can reach intermediate voltage Vdd/2 within an estimated period.

In FIG. 22 at (f), a period Tsw from time t3 to time tw0s is a period for setting the electric potentials at cell power lines Vssn, Vddp and bit lines BL, /BL at intermediate voltage Vdd/2. When adopting a clock synchronization type SRAM, it is only necessary to take a sufficient clock cycle and set period Tsw in the design stage. Moreover, as shown in FIG. 22 at (c) and (f), it is only necessary to design a period Tew from time tw0e to time t5 so as to ensure that signal S is at the low level until time tw0e at which the electric potential at word line WL0 is completely brought into the low level.

As shown in FIG. 22, random data appearing in a memory cell can be read by starting a Read cycle after one cycle of data generation. Assuming the data generation cycle and the Read cycle as one set, random data can be generated in and read from all the memory cells by repeating one set for each of word lines WL0 to WL(n−1).

In the first to fourth embodiments of the present invention and the modifications, the value of intermediate voltage Vdd/2 shall be obtained by dividing the difference between supply voltages Vdd and Vss by 2. The reason is that data appearing in a memory cell is determined by the magnitude correlation among the threshold voltages of the four MOS transistors constituting the inverters in the memory cell. For example, if intermediate voltage Vdd/2 is set at supply voltage Vdd, cell power line Vddp will be continuously fixed at supply voltage Vdd, and the gates of the four MOS transistors will also be maintained fixed at supply voltage Vdd even if the electric potential at cell power line Vssn drops. After all, data is determined by one of two n-type transistors being brought into the conducting state.

Moreover, setting intermediate voltage Vdd/2 at the value obtained by dividing the difference between supply voltages Vdd and Vss by 2 allows the electric potentials at the storage nodes in a memory cell to transition from intermediate voltage Vdd/2 to supply voltage Vdd or from intermediate voltage Vdd/2 to Vss at the earliest. Furthermore, although not set forth in the description of the present invention, it is assumed that a p-type transistor is formed in an N well. Thus, the N well and the source of the p-type transistor will be set at a common electric potential. Therefore, even if the electric potential at cell power line Vddp which is the electric potential at the source of the p-type transistor is controlled to rise/drop, no electric potential difference arises between the source of the p-type transistor and the N well.

A substrate for an n-type transistor is a p-type silicon substrate without using a special well, and is fixed at supply voltage Vss. With the present system in which the electric potential at the source of the n-type transistor connected to cell power line Vssn becomes higher than the electric potential at a silicon substrate, a junction withstand voltage is of concern. Therefore, as shown in the previous embodiments, the intermediate voltage is set at Vdd/2, so that the electric potential difference produced between the source and the substrate can be made relatively small.

In view of the above-described reason for setting the intermediate voltage, when the generation speed of data appearing at a storage node in a memory cell is not essential, the value of intermediate voltage Vdd/2 in the present embodiment is not limited to the value obtained by dividing the difference between supply voltages Vdd and Vss by 2. Moreover, the following are not restrictive conditions when appearing data is determined by one of a p-type transistor and an n-type transistor. However, for determining appearing data by the magnitude correlation among the threshold voltages of the four MOS transistors as described above, the following conditions are necessary.

It is preferable to set the intermediate voltage lower than threshold Vthp of a p-type transistor with reference to supply voltage Vdd and higher than threshold Vthn of an n-type transistor with reference to supply voltage Vss. The intermediate voltage in this case can be expressed as follows:

$$Vss+Vthn < \text{intermediate voltage } Vdd/2 < Vdd-|Vthp|$$

The value of intermediate voltage Vdd/2 adopted in the previous embodiments can be set by the resistance values of resistors R1, R2 and R3 in intermediate voltage generation circuit 110 shown in FIG. 2.

In the first to fourth embodiments of the present invention and the modifications, identification information generation circuits 100_1 to 100_4 are described as having four memory macros (150, 160, 170, and 180 shown in FIGS. 1, 12, 16, and 20). However, the number of memory macros is not limited to four, and can be set at one or more according to necessity without affecting the object, functions and effects of the present invention.

In the first to fourth embodiments of the present invention and the modifications, a single circuit block is used for a plurality of memory macros in power supply control circuits 140_1, 140_11, 140_12, 140_2, and 140_3, however, a circuit block may be used for each of the plurality of memory macros. Furthermore, a power supply control circuit may be used for each memory macro.

Memory array 151_4 according to the fourth embodiment of the present invention has bit line intermediate voltage supply circuit EQhvd connected to each bit line pair (BL, /BL). This bit line intermediate voltage supply circuit EQhvd can be arranged similarly in the other embodiments of the present invention and the modifications.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A semiconductor device comprising an identification information generation circuit including
a power supply control circuit having a first input node to which a first control signal is applied, a first power supply voltage output node and a second power supply voltage output node, and
a memory array having a bit line pair, a word line, a memory cell connected to said bit line pair and said word line, a first cell power line connected to said memory cell, and a second cell power line connected to said memory cell,
said first cell power line and said second cell power line being connected to said first power supply voltage output node and said second power supply voltage output node, respectively,
said memory cell having a first conductivity type MOS transistor and a second conductivity type MOS transistor,
said power supply control circuit being configured to
output a first supply voltage and a second supply voltage to said first power supply voltage output node and said second power supply voltage output node, respectively, when said first control signal is in a first state, and
output an intermediate voltage to said first power supply voltage output node and said second power supply voltage output node when said first control signal is in a second state.

2. The semiconductor device according to claim 1, wherein said intermediate voltage has a value higher than a value obtained by adding an absolute value of a threshold voltage of said first conductivity type MOS transistor to said first supply voltage and lower than a value obtained by subtracting an absolute value of a threshold voltage of said second conductivity type MOS transistor from said second supply voltage.

3. The semiconductor device according to claim 1, wherein, in response to said first control signal, said power supply control circuit applies said intermediate voltage to said first cell power line and said second cell power line for a predetermined time period, and then applies said first supply voltage and said second supply voltage to said first cell power line and said second cell power line, respectively.

4. The semiconductor device according to claim 1, wherein, in response to a change of said first control signal from said second state to said first state, said power supply control circuit applies said first supply voltage and said second supply voltage to said first cell power line and said second cell power line, respectively.

5. The semiconductor device according to claim 1, wherein, in response to a change of said first control signal from said second state to said first state, said power supply control circuit applies said second supply voltage to said second cell power line, and after a lapse of a first delay time, applies said first supply voltage to said first cell power line.

6. The semiconductor device according to claim 1, wherein, in response to a change of said first control signal from said second state to said first state, said power supply control circuit applies said first supply voltage to said first cell power line, and after a lapse of a second delay time, applies said second supply voltage to said second cell power line.

7. The semiconductor device according to claim 1, wherein said power supply control circuit further includes a second input node to which a second control signal is applied,
within a period in which said second control signal is in one of said first state and said second state, in response to a change of said first control signal from said second state to said first state, said power supply control circuit applies said second supply voltage to said second cell power line, and after a lapse of a first delay time, applies said first supply voltage to said first cell power line, and
within a period in which said second control signal is in the other one of said first state and said second state, in response to the change of said first control signal from said second state to said first state, said power supply control circuit applies said first supply voltage to said first cell power line, and after a lapse of a second delay time, applies said second supply voltage to said second cell power line.

8. A semiconductor device comprising an identification information generation circuit including
- a power supply control circuit having a first input node to which a first control signal is applied, a first power supply voltage output node and a second power supply voltage output node, and
- a latch circuit having a first inverter having a first conductivity type MOS transistor and a second conductivity type MOS transistor whose drains are connected in common at a first storage node, and a second inverter having a first conductivity type MOS transistor and a second conductivity type MOS transistor whose drains are connected in common at a second storage node, said first inverter having its input and output being cross-coupled to the output and input of said second inverter, respectively,
- a first cell power line and a second cell power line being connected to sources of said first conductivity type MOS transistors and said second conductivity type MOS transistors of said latch circuit, respectively,
- said first cell power line and said second cell power line being connected to said first power supply voltage output node and said second power supply voltage output node, respectively, and
- said power supply control circuit outputting a first supply voltage and a second supply voltage to said first power supply voltage output node and said second power supply voltage output node, respectively, when said first control signal is in a first state, and outputting an intermediate voltage to said first power supply voltage output node and said second power supply voltage output node when said first control signal is in a second state.

9. The semiconductor device according to claim 8, wherein said intermediate voltage has a value higher than a value obtained by adding an absolute value of a threshold voltage of said first conductivity type MOS transistor to said first supply voltage and lower than a value obtained by subtracting an absolute value of a threshold voltage of said second conductivity type MOS transistor from said second supply voltage.

10. The semiconductor device according to claim 8, wherein, in response to a change of said first control signal from said second state to said first state, said power supply control circuit applies said first supply voltage and said second supply voltage to said first cell power line and said second cell power line, respectively.

11. An identification information generation method for a semiconductor device, said semiconductor device including a latch circuit in which a first inverter having a first conductivity type MOS transistor and a second conductivity type MOS transistor whose drains are connected in common at a first storage node and a second inverter having a first conductivity type MOS transistor and a second conductivity type MOS transistor whose drains are connected in common at a second storage node are cross-coupled, a first cell power line and a second cell power line being connected to sources of said first conductivity type MOS transistors and said second conductivity type MOS transistors of said latch circuit, respectively, said method comprising:
- applying an intermediate voltage to said first cell power line and said second cell power line for a predetermined time period, said intermediate voltage having a value higher than a value obtained by adding an absolute value of a threshold voltage of said first conductivity type MOS transistors to a first supply voltage and lower than a value obtained by subtracting an absolute value of a threshold voltage of said second conductivity type MOS transistors from a second supply voltage;
- varying electric potentials at said first cell power line and said second cell power line from said intermediate voltage to said first supply voltage and said second supply voltage, respectively; and
- reading data stored in said first node and said second storage node.

12. The identification information generation method according to claim 11, wherein said first supply voltage and said second supply voltage are respectively applied simultaneously to said first cell power line and said second cell power line maintained at said intermediate voltage.

13. The identification information generation method according to claim 11, wherein one of application of said first supply voltage to said first cell power line maintained at said intermediate voltage and application of said second supply voltage to said second cell power line maintained at said intermediate voltage is started, and the other one is started after a lapse of a predetermined delay time from the start of said one.

* * * * *